US012156602B2

(12) United States Patent
Neill et al.

(10) Patent No.: US 12,156,602 B2
(45) Date of Patent: Dec. 3, 2024

(54) MODULAR MAT SYSTEM

(71) Applicant: R & L Marketing & Sales, Inc., Boardman, OH (US)

(72) Inventors: David M. Neill, Canfield, OH (US); Ronald N. Kessler, Girard, OH (US)

(73) Assignee: R&L MARKETING & SALES, INC., Boardman, OH (US)

( * ) Notice: Subject to any disclaimer, the term of this patent is extended or adjusted under 35 U.S.C. 154(b) by 28 days.

(21) Appl. No.: 18/067,753

(22) Filed: Dec. 19, 2022

(65) Prior Publication Data

US 2023/0121533 A1    Apr. 20, 2023

Related U.S. Application Data

(60) Division of application No. 17/120,443, filed on Dec. 14, 2020, now Pat. No. 11,596,253, which is a
(Continued)

(51) Int. Cl.
| | |
|---|---|
| *E04B 2/00* | (2006.01) |
| *A47G 27/02* | (2006.01) |
| *B29C 45/02* | (2006.01) |
| *B29C 45/04* | (2006.01) |
| *B29C 45/14* | (2006.01) |

(Continued)

(52) U.S. Cl.
CPC ..... *A47G 27/0293* (2013.01); *A47G 27/0218* (2013.01); *B29C 45/02* (2013.01); *B29C 45/0441* (2013.01); *B29C 45/14* (2013.01); *B29C 45/16* (2013.01); *B29D 99/0057* (2013.01); *B29K 2995/007* (2013.01); *E04F 15/10* (2013.01)

(58) Field of Classification Search
CPC ............ A47G 27/0293; A47G 27/0218; A47G 27/0206; B29C 45/14; B29D 99/0057
See application file for complete search history.

(56) References Cited

U.S. PATENT DOCUMENTS

| | | | |
|---|---|---|---|
| 3,936,987 | A | 2/1976 | Calvin |
| 5,323,575 | A | 6/1994 | Yeh |
(Continued)

FOREIGN PATENT DOCUMENTS

| | | |
|---|---|---|
| CN | 112716249 A | 4/2021 |
| DE | 69821122 T2 | 11/2004 |
| WO | 1999/53811 | 10/1999 |

OTHER PUBLICATIONS

Combined Search and Examination Report; UK Intellectual Property Office; Sep. 21, 2023.
Search Report; UK Intellectual Property Office; Sep. 20, 2023.

*Primary Examiner* — Basil S Katcheves
(74) *Attorney, Agent, or Firm* — Sand, Sebolt & Wernow Co., LPA

(57) ABSTRACT

The present disclosure relates to a modular mat system. More particularly, the disclosure is directed to a modular mat system with that may be built out using common pieces of mats. Specifically, a modular mat system with a mat piece with a top plate with inserts, a bottom plate with a plurality of tabs and recesses operative to engage with further mat pieces to build a mat system is discussed. The modular mat system is operative to remove water and other detritus from shoes of a user or other such platform moving across the mat system and feed it to a perimeter drain below the system.

15 Claims, 39 Drawing Sheets

Related U.S. Application Data continuation-in-part of application No. 16/527,145, filed on Jul. 31, 2019, now Pat. No. 11,060,301, and a continuation-in-part of application No. 16/527,115, filed on Jul. 31, 2019, now Pat. No. 10,912,443.

(51) Int. Cl.
  *B29C 45/16* (2006.01)
  *B29D 99/00* (2010.01)
  *E04F 15/10* (2006.01)

(56) References Cited

U.S. PATENT DOCUMENTS

| | | | |
|---|---|---|---|
| 5,435,715 A | 7/1995 | Campbell | |
| 5,904,021 A | 5/1999 | Fisher | |
| 5,919,540 A | 7/1999 | Bailey | |
| 5,950,378 A | 9/1999 | Council et al. | |
| 6,050,044 A | 4/2000 | McIntosh | |
| 7,303,800 B2 | 12/2007 | Rogers | |
| 7,543,417 B2 | 6/2009 | McIntosh et al. | |
| 7,571,573 B2 | 8/2009 | Moller, Jr. | |
| 7,908,802 B2 | 3/2011 | Frederiksen | |
| 8,099,915 B2 | 1/2012 | Moller, Jr. et al. | |
| 8,225,566 B2 | 7/2012 | Prevost et al. | |
| 8,596,012 B2 | 12/2013 | Franchini | |
| 8,833,007 B2 | 9/2014 | Tillery et al. | |
| 8,993,098 B2 | 3/2015 | Masanek et al. | |
| 9,216,678 B1 | 12/2015 | Mobley | |
| 9,339,981 B2 * | 5/2016 | Masanek, Jr. | E04F 15/02038 |
| 9,717,309 B2 | 8/2017 | Bulger | |
| 9,771,722 B2 * | 9/2017 | Hurson | B32B 37/1027 |
| 9,863,155 B2 * | 1/2018 | Cerny | E04F 15/225 |
| 10,030,337 B2 | 7/2018 | Kim | |
| 10,072,383 B1 * | 9/2018 | Stiles | E01C 5/001 |
| 10,106,980 B2 | 10/2018 | Martinez | |
| 10,266,993 B2 | 4/2019 | Szekely et al. | |
| 2006/0127647 A1 | 6/2006 | Thrush | |
| 2006/0236487 A1 | 10/2006 | Dean | |
| 2006/0285920 A1 | 12/2006 | Gettig et al. | |
| 2007/0269265 A1 | 1/2007 | Thorkelson et al. | |
| 2008/0166521 A1 | 7/2008 | Kessler | |
| 2009/0031658 A1 * | 2/2009 | Moller, Jr. | E01C 13/045 52/578 |
| 2009/0139017 A1 * | 6/2009 | Anderson | E03D 13/005 4/251.1 |
| 2009/0139160 A1 | 6/2009 | Hill | |
| 2009/0256282 A1 | 10/2009 | Olaru | |
| 2009/0266022 A1 | 10/2009 | Lin | |
| 2010/0088982 A1 | 4/2010 | Fogil et al. | |
| 2011/0061336 A1 * | 3/2011 | Thomas | E04B 1/10 52/745.19 |
| 2011/0076457 A1 | 3/2011 | Reichwein et al. | |
| 2011/0104434 A1 | 5/2011 | Masanek, Jr. et al. | |
| 2011/0179728 A1 | 7/2011 | Cerny et al. | |
| 2012/0085043 A1 | 4/2012 | Jenkins et al. | |
| 2013/0093115 A1 * | 4/2013 | Masanek, Jr. | E04F 15/02172 264/255 |
| 2013/0093116 A1 * | 4/2013 | Masanek, Jr. | B29C 45/14344 264/255 |
| 2013/0095295 A1 | 4/2013 | Masanek, Jr. | |
| 2013/0111836 A1 * | 5/2013 | Masanek, Jr. | E04B 5/48 52/302.1 |
| 2013/0167458 A1 | 7/2013 | Cerny et al. | |
| 2013/0193613 A1 | 8/2013 | Grimm | |
| 2013/0249144 A1 | 9/2013 | Carlson et al. | |
| 2013/0276399 A1 * | 10/2013 | Rapaz | E01C 5/20 52/592.1 |
| 2014/0127449 A1 | 5/2014 | Wang | |
| 2014/0325924 A1 | 11/2014 | Schuster | |
| 2015/0075092 A1 | 3/2015 | Moller, Jr. et al. | |
| 2015/0246502 A1 | 9/2015 | Lloyd | |
| 2016/0183764 A1 | 6/2016 | Lee | |
| 2017/0326810 A1 | 11/2017 | Neill et al. | |
| 2018/0347207 A1 * | 12/2018 | Hayes | B32B 7/09 |
| 2019/0217571 A1 | 7/2019 | Ohashi et al. | |
| 2020/0113411 A1 | 4/2020 | Shin | |
| 2020/0163532 A1 | 5/2020 | George | |

\* cited by examiner

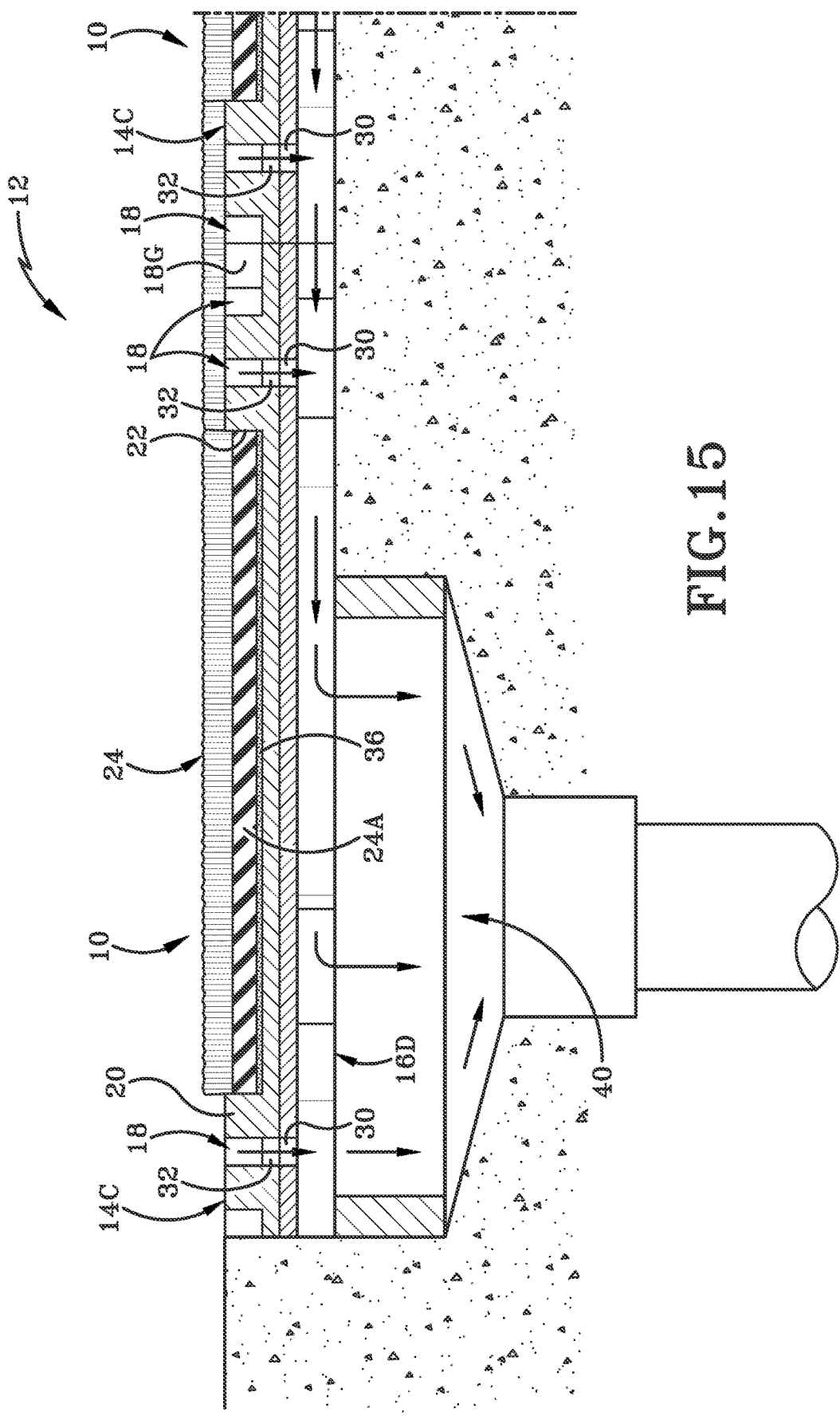

MODULAR MAT SYSTEM

This application is a divisional of U.S. patent application Ser. No. 17/120,443, filed Dec. 14, 2020, which is a Continuation-in-Part of U.S. patent application Ser. No. 16/527,145, filed Jul. 31, 2019, now U.S. Pat. No. 11,060,301.

U.S. patent application Ser. No. 17/120,443, filed Dec. 14, 2020 is additionally a Continuation-In-Part of U.S. patent application Ser. No. 16/527,115, filed Jul. 31, 2019, now U.S. Pat. No. 10,912,443.

The disclosures of the aforementioned patent applications are incorporated herein by reference in their entirety.

TECHNICAL FIELD

The present disclosure relates generally to a modular mat system. More particularly, the present disclosure relates to a modular mat system that may be built out using common pieces. Specifically, the present disclosure relates to a modular mat system with a mat piece with a top plate with inserts, a bottom plate with a plurality of tabs and recesses operative to engage with further mat pieces to build a mat system.

BACKGROUND OF THE INVENTION

In the past, floor mats were made for specific purposes. Mats were made for entrance ways, commercial kitchen fatigue mats, oil resistance, snow and water removal, etc. Most of the above uses required specific mat constructions to perform whatever use was required. Sometimes it took more than one supplier to provide all of the requirements. If one mat supplier tried to cover the field, the investment in machinery, people, and skills made it very expensive to react to the demand. Warehousing alone was expensive in order to have the specific purpose product on demand.

Floor mats are often used at the entrances of businesses for customers to wipe water and snow from the bottoms of their shoes. Conventional floor mats are constructed of a flexible rubber and are formed with a plurality of spaced apart orthogonal ribs which form rectangular-shaped openings. These conventional floor mats require that a recessed area be formed in the floor where the floor mats are located with the edges of the recessed area preventing the floor mats from sliding when walked upon by a customer. The water, snow or other small sized detritus from the customer's shoes flows through the openings keeping the top surface of the floor mat free of standing water and dirt.

Although these prior art floor mats are adequate for the purpose for which they were intended, the business owner must plan for the installation of these floor mats and have the recessed area built into the floor during construction of the building. If these prior art floor mats are merely placed on the floor without a recessed area the floor mats slide when a horizontal pressure from a customer's shoes or from any strong wind or outside force is applied on the mats. Alternatively, the recessed area can be dug out of the floor after the building has been constructed at a great expense to the business owner. Additionally, even when a recessed area has been provided to accept the floor mat, if large mats are utilized, or a number of mats are utilized adjacent one another, the mats may still move within the recessed area possibly causing an unsafe condition for those using them.

However, as many of these mats are utilized in high traffic or high stress environments, wear and tear, or outright failure is likely to occur the longer the mats are installed and exposed to these risks. Additionally, the cost to replace an entire mat structure may be very costly as well as time consuming from a manufacturing standpoint.

SUMMARY OF THE INVENTION

As a result, these mats could be improved tremendously if a mat could be made up of individual pieces be provided which could be placed and replaced easily. This would decrease any down time, as well as expense, as only a few pieces may need to be changed.

In one aspect, an exemplary embodiment of the present disclosure may provide a modular floor mat system comprising: a plurality of tiles, each tile comprising: a first plate defining a plurality of through holes, at least one insert accepting area defined in the first plate, an insert disposed in the at least one insert accepting area, tabs extending from a side of the tile, apertures recessed from the side of the tile wherein the tabs of the tile are operative to nest within the apertures of another tile and may be built out to form a surface of a plurality of tiles. This exemplary embodiment or another exemplary embodiment may further provide for a second plate defining a second plurality of through holes aligned with the plurality of through holes of the first plate, the second plate operatively connected to the first plate. This exemplary embodiment or another exemplary embodiment may further provide for the second plate has a differing durometer hardness from the first plate. This exemplary embodiment or another exemplary embodiment may further provide for the tabs and apertures are on a perimeter side of the second plate. This exemplary embodiment or another exemplary embodiment may further provide for the first plate is a different color from the second plate and is operative to act as an indicator to replace the tile when the first plate may be worn. This exemplary embodiment or another exemplary embodiment may further provide for the second plate has a left side, a right side, a front side and a rear side, wherein the plurality of tabs are not located on the front side. This exemplary embodiment or another exemplary embodiment may further provide for a drain operative to be fed by the through holes by removing water from a top surface of the first plate and through the through holes of the top plate to the through holes of the second plate. This exemplary embodiment or another exemplary embodiment may further provide for the first plate and second plate are operatively connected by an adhesive. This exemplary embodiment or another exemplary embodiment may further provide for a releasable connection between the insert and the insert accepting area. This exemplary embodiment or another exemplary embodiment may further provide for the insert is a carpet insert. This exemplary embodiment or another exemplary embodiment may further provide for the insert is a gel insert. This exemplary embodiment or another exemplary embodiment may further provide for a plurality of channels that trace the insert accepting area and wherein the channels are interrupted by the plurality of through holes in the first plate. This exemplary embodiment or another exemplary embodiment may further provide for a plurality of channel exits located on the first plate operative to carry water or other debris into at least one adjacent floor tile. This exemplary embodiment or another exemplary embodiment may further provide for the insert accepting area is a different color from the rest of the first plate operative to act as an indicator to replace an insert when the insert may be worn. This exemplary embodiment or another exemplary embodiment may further provide for the density of the insert is less than that of the first plate. This exemplary embodiment or another exemplary embodiment may further provide for the insert is operatively connected to the insert accepting areas via an adhesive. This exemplary embodiment or another exemplary embodiment may further provide for each tile has three insert accepting areas. This exemplary embodiment or another exemplary embodiment may further provide for the plurality of tabs comprise a thin section proximate the bottom plate and a thicker section distal from the thin section.

In another aspect, an exemplary embodiment of the present disclosure may provide a method of building a modular mat comprising: abutting a portion of a first tile with a portion of a second tile, tilting either tile at an angle less than 90 degrees from its normal position while maintaining the other tile in its normal position, rotating the tile tilted in the previous step back to its normal position, engaging at least one tab located on the first tile with at least one aperture defined by the second tile, and repeating all of the steps by abutting a plurality of additional tiles with further tiles until a desired shape of a modular mat is reached.

In yet another aspect, an exemplary embodiment of the present disclosure may provide a method of replacing a modular mat portion: viewing a modular mat, wherein the modular mat comprises: a plurality of tiles, each tile comprising: a first plate defining a plurality of through holes, at least one insert accepting area, at least one insert disposed in the at least one insert accepting area and a second plate, wherein each the first plate, second plate and insert accepting areas are of a different color operative to provide a visual indicator defined by an indicator layer to a user that the first plate of the tile or the insert is broken, fractured or otherwise damaged, and needs replaced, exposing the indicator layer on one or more tile or one or more insert accepting areas, viewing the exposed indicator layer, removing and disposing the tile or the remaining insert in response to viewing the exposed indicator layer, and replacing any tile or any insert with the exposed indicator layer for another tile or insert without an exposed indicator layer.

BRIEF DESCRIPTION OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 15 (FIG. 15) is a section view along line 15-15 in FIG. 1 of a perimeter drain below the assembled floor mat.

Similar numbers refer to similar parts throughout the drawings.

DETAILED DESCRIPTION

A new modular flooring piece 10, system 12, and method of operation thereof is depicted in the present disclosure and throughout FIGS. 1-16E. The modular flooring piece 10 is a new and improved apparatus, as will be discussed and described hereafter.

Figure 1:
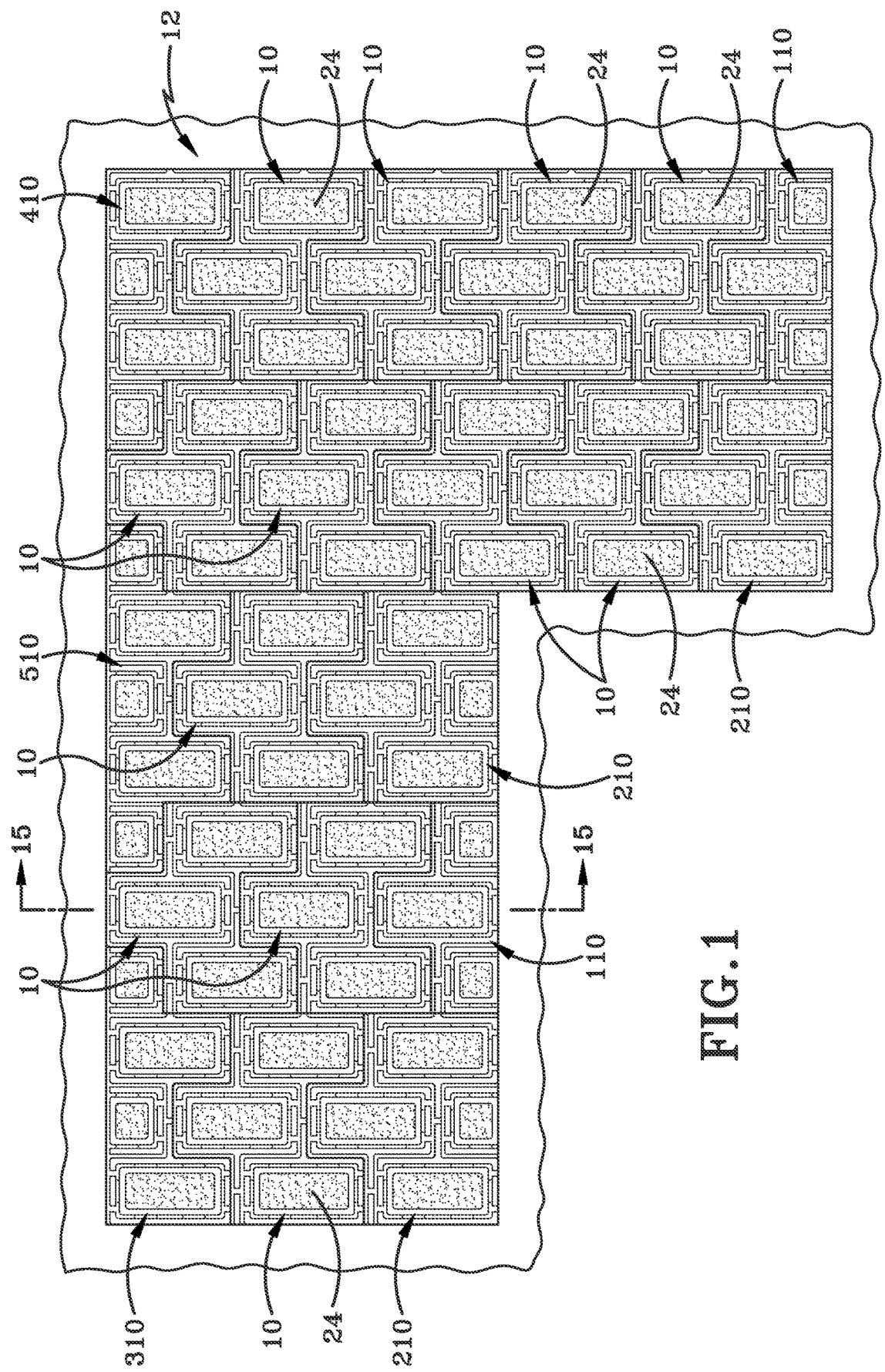
FIG. 1 (FIG. 1) is a top plan view of an exemplary assembled floor mat.
Figure 2:
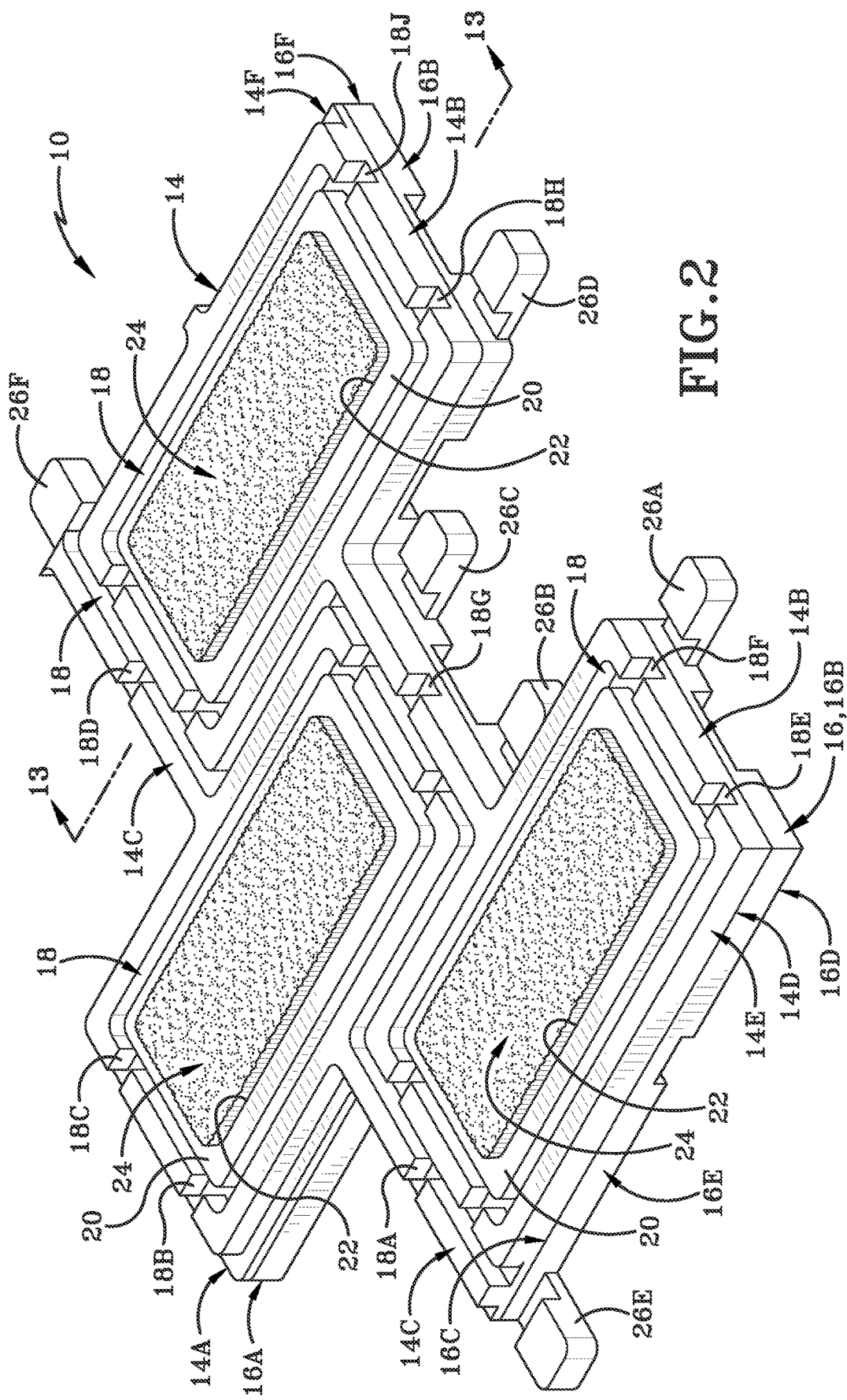
FIG. 2 (FIG. 2) is an isometric top perspective view of an assembled exemplary modular piece.

Referring now to FIG. 1 and FIG. 2, an assembled version of the system 12 of the modular floor made of modular flooring pieces 10 is shown. Referring specifically to a single piece 10 shown in FIG. 2, the flooring piece 10 includes of a top plate 14 and a bottom plate insert. As used hereinafter the top plate 14 may also be referred to as a first plate and the bottom plate 16 may be referred to as a second plate. The top plate 14 has a front side face 14A, a back side face 14B, a top 14C, a bottom 14D, a first side 14E, and a second side 14F. Similarly, the bottom plate 16 has a front side face 16A, a back side face 16B, a top 16C, a bottom 16D, a first side 16E and a second side 16F. The bottom 14D of the top plate 14 is operative to sit directly on top of the top side 16C bottom plate 16 with an identical shape and is operatively connected thereto.

The piece 10 has a staggered configuration of a sideways American football goalpost shape or block Y shape. This staggered configuration allows for the assembled version, or assembly 12 to be built out in a wide variety of shapes while maintaining structural stability. Within the assembly 12, there may be a first tile and a second tile and the two tiles have sides that are complementary shaped to one another. In one such embodiment, the first side of the first tile is complementary shaped to the second side of the second tile. This complementary shape is defined by a protrusion and recess within each individual tile 10. The recess and protrusion each have an outer perimeter wall and in one embodiment are generally C-shaped and non-linear. The size of the tile is about 5 inches long and 13 inches long and 5 inches wide and 13 inches wide. In a further embodiment, the size of the tile is about 7 inches long and 9 inches long and 7 inches wide and 9 inches wide.

The bottom plate 16 is made from a different durometer hardness material than the top plate 14. Generally, the bottom plate 16 will have a higher durometer hardness material. Further, the colors of the top plate 14 and the bottom plate 16 may be the different or the same. As a result, if the color of the bottom plate 16 is able to be viewed, it may act as a visual indicator to a user that the top plate 14 must be replaced as the top plate 14 is worn.

An exemplary embodiment provides for a plurality of interconnected channels 18 on the upper surface of the top plate 14 that trace along the top plate 14. These channels terminate at the front side face 14A of the top plate 14 with four channel exits 18A, 18B, 18C, 18D, while at the back side face 14B of the top plate 14 there are five channel exits 18E, 18F, 18G, 18H, 18J. In an exemplary embodiment, the channels 18 bound and trace walls 20 as well as the piece 10 as a whole. Inside of these traced walls 20 is an insert accepting area 22 and an insert 24.

In an exemplary embodiment, each tile 10 has three insert accepting areas 22. However, further configurations have been contemplated. The insert accepting area 22 may be a different color than either the top plate 14 or bottom plate 16. The insert 24 is operatively coupled to the top surface 14C of the top plate 14 at its bottom 24A within its insert accepting area 22. The insert 24 may be made from a carpeted material, a tear-resistant microfiber, a non-woven surface, or from a polymer gel or gel-like material. The insert accepting area 22 may be of a different color when compared to uncovered portions of the top plate 14. As a result, if the insert accepting area is visible, it may act as a visual indicator to a user that an insert 24 must be placed within the insert accepting area 22, or that the insert must be replaced. The density of the insert 24 is lower than the density of the top plate 14 in some embodiments and may differ from the bottom plate 16 as well.

The exemplary embodiment further provides for a plurality of tabs 26 on the tile 10. In one embodiment, the tabs are located on the bottom plate 16. The plurality of tabs includes four 26A, 26B, 26C, 26D on the back face side 16B as well as one tab 26E on the first side 16E and one tab 26F on the second side 16F. All of the tabs are generally U-shaped with a thinner rectangular section proximate the bottom plate 16 and a step to a larger section distal the bottom plate 16 relative to the proximal thin section.

Figure 3:
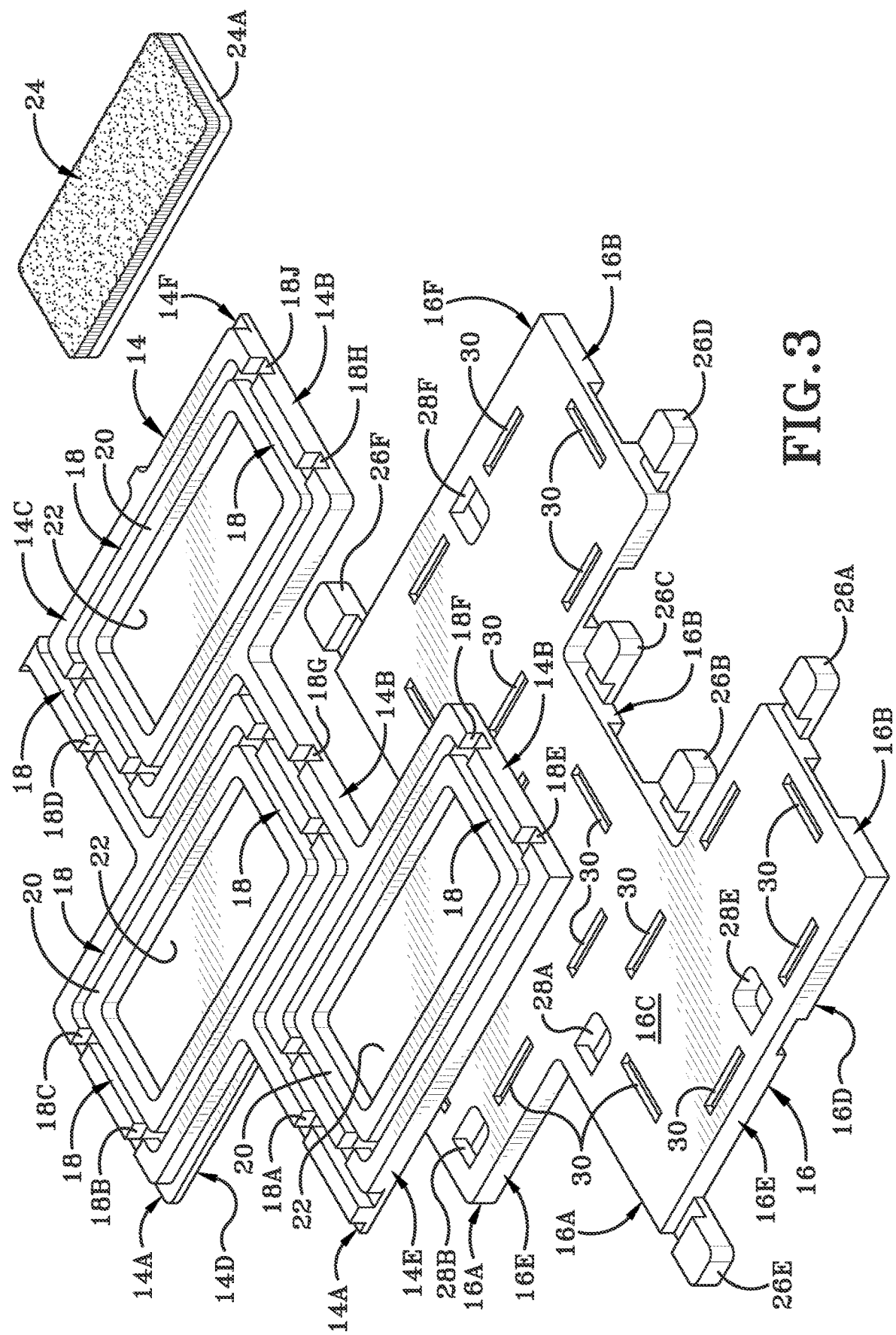
FIG. 3 (FIG. 3) is an exploded view of the modular piece.

Referring now to FIG. 3, an exploded view of an exemplary piece 10 is shown. The exploded piece 10 is operative to show the insert 24 exploded away from the traced walls 20. Only one insert 24 is shown exploded out for the purposes of brevity and clarity, though up to three may be seen in a view such as this. A bottom 24A of the insert 24 is operatively engaged with the insert accepting area 22 through any manner of abutting contact.

Figure 4:
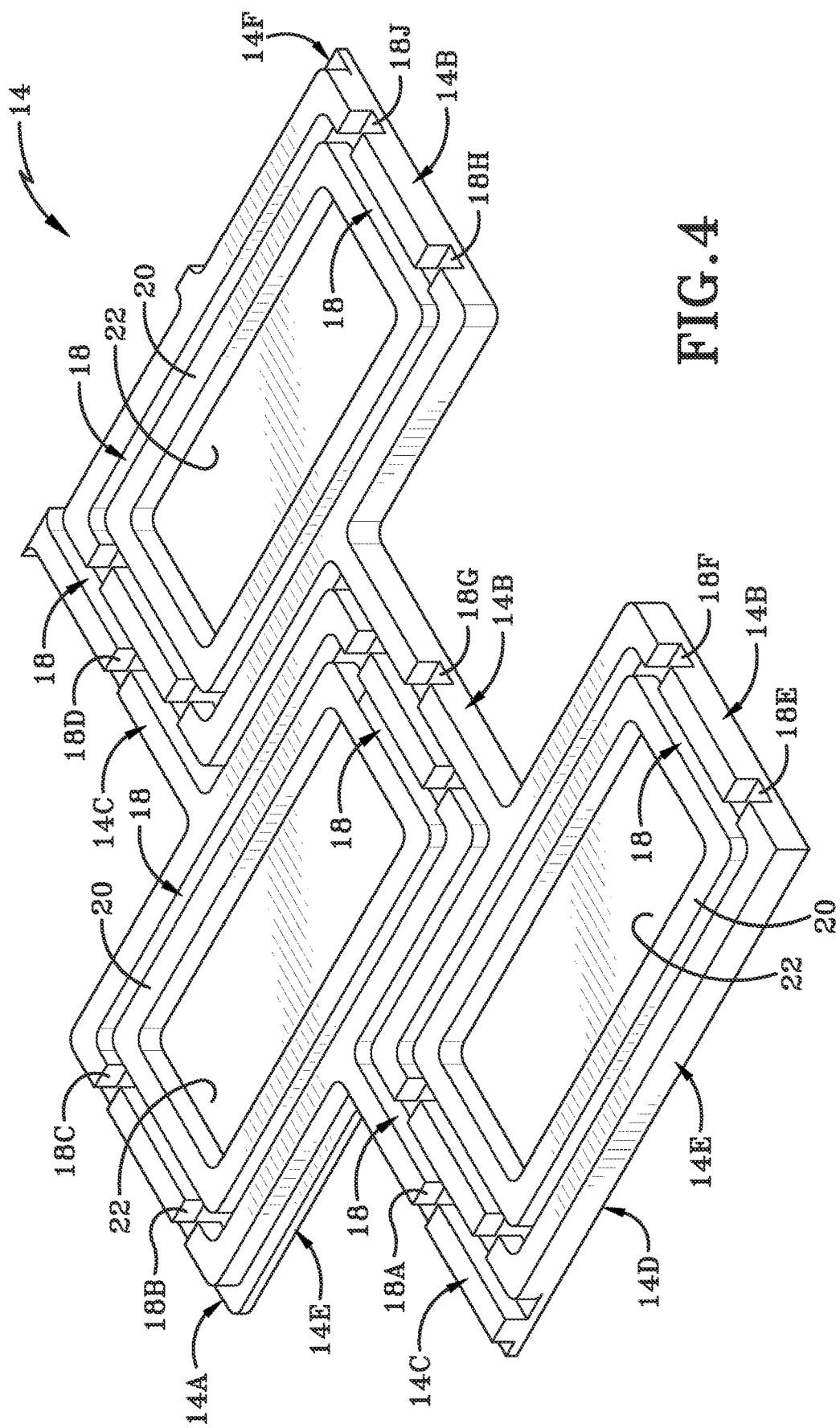
FIG. 4 (FIG. 4) is an isometric top perspective view of a top plate of the modular piece.
Figure 5:
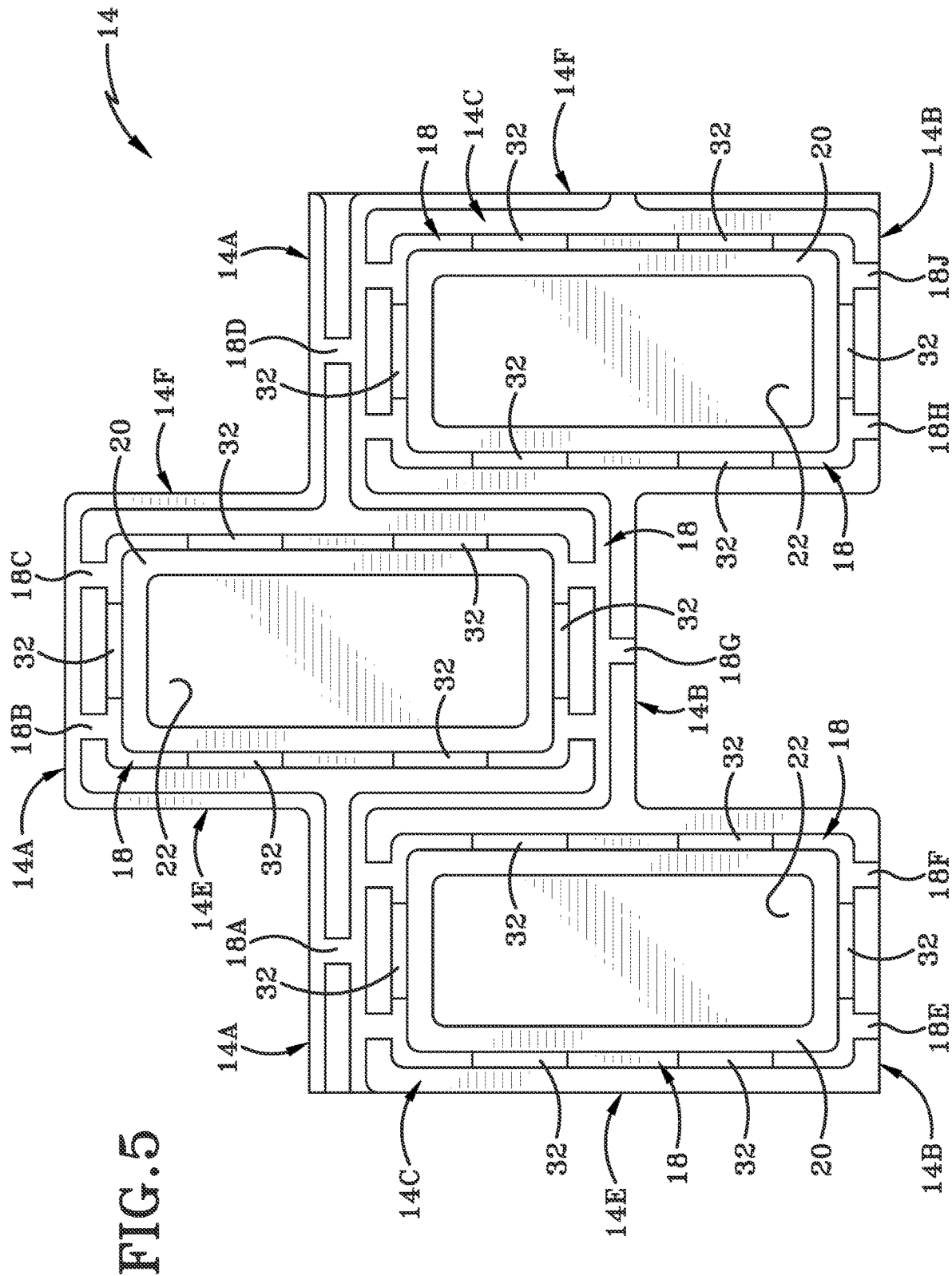
FIG. 5 (FIG. 5) is a top plan view of the top plate of the modular piece.
Figure 6:
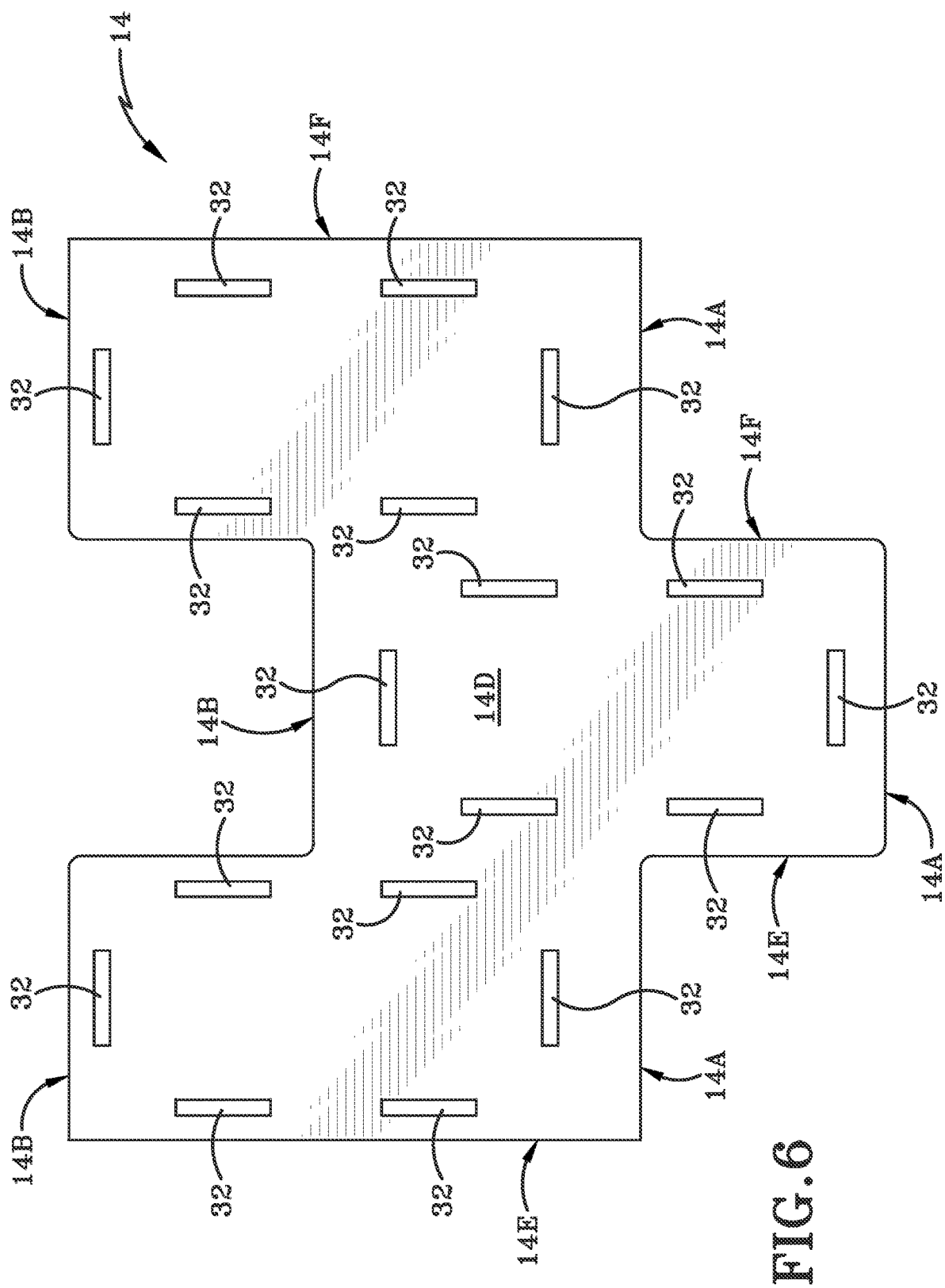
FIG. 6 (FIG. 6) is a bottom plan view of the top plate of the modular piece.

Further, the tile 10 has a plurality of apertures 28. In one embodiment, the apertures are on the bottom plate 16. The apertures 28 include four 28A, 28B, 28C, 28D on the front side face 16A of the bottom plate 16, as well as one 28E aperture on the first side 16E and one 28F aperture on the second side 18F. The apertures 28 are of complementary shapes with the tabs 26 with a thin section followed by a step to a larger section and are able to be engaged therewith as will be discussed later. Further shown in FIG. 3 are a plurality of through holes 30 within the bottom side 14D of the top plate 14. Referring now to FIG. 4, FIG. 5, and FIG. 6, views of the top plate 14 with the inserts 24 removed is shown. In these views, we can see a further plurality of through holes 32 that occur in the top plate. The through holes 32 are aligned with the through holes 30 in the top side 16C of the bottom plate 16 prior to engaging the top plate 14 with the bottom plate 16. For the sake of brevity, the through holes 30, 32 will be described in their location with respect to the top plate 14 and the through holes 32. In both instances of through holes 30, 32 they extend through the thickness of each plate defined as the distance from top 14A, 16A to bottom 14B, 16B. The through holes 32 are located within the channel 18 and the channel 18 is interrupted by the through holes 32. The through holes directly abut the outer walls of the insert accepting area 22. In one embodiment, there are two through holes 32 along each of the pair of longitudinal outer walls of the insert accepting area 22 while there is one through hole 32 along each of the pair of transverse outer walls of the insert accepting area 22. Thus, this exemplary embodiment contains six total through holes 32 per each insert accepting area 22. However, additional through holes of varying dimension and size may be implored based on the intended use of the mat 12 as a whole. More or less through holes with a wide variety of different sizes may be implored based on the final desired use for the system.

Further, the channels which terminate at the front side face 14A of the top plate 14 with the four channel exits 18A, 18B, 18C, 18D along with the back side face 14B channel exits 18E, 18F, 18G, 18H, 18J may be better seen from this view. The channels 18 bound and traced walls 20 as well as the piece 10 as a whole. Inside of the traced walls 20 is an insert accepting area 22 and an insert 24. The insert 24 is operatively coupled to the top surface 14C of the top plate 14 at its bottom 24A within its insert accepting area 22. Further, from these views we may see the bottom 14D of the top plate 14 is substantially smooth with the presence of the through holes 32.

Figure 7:
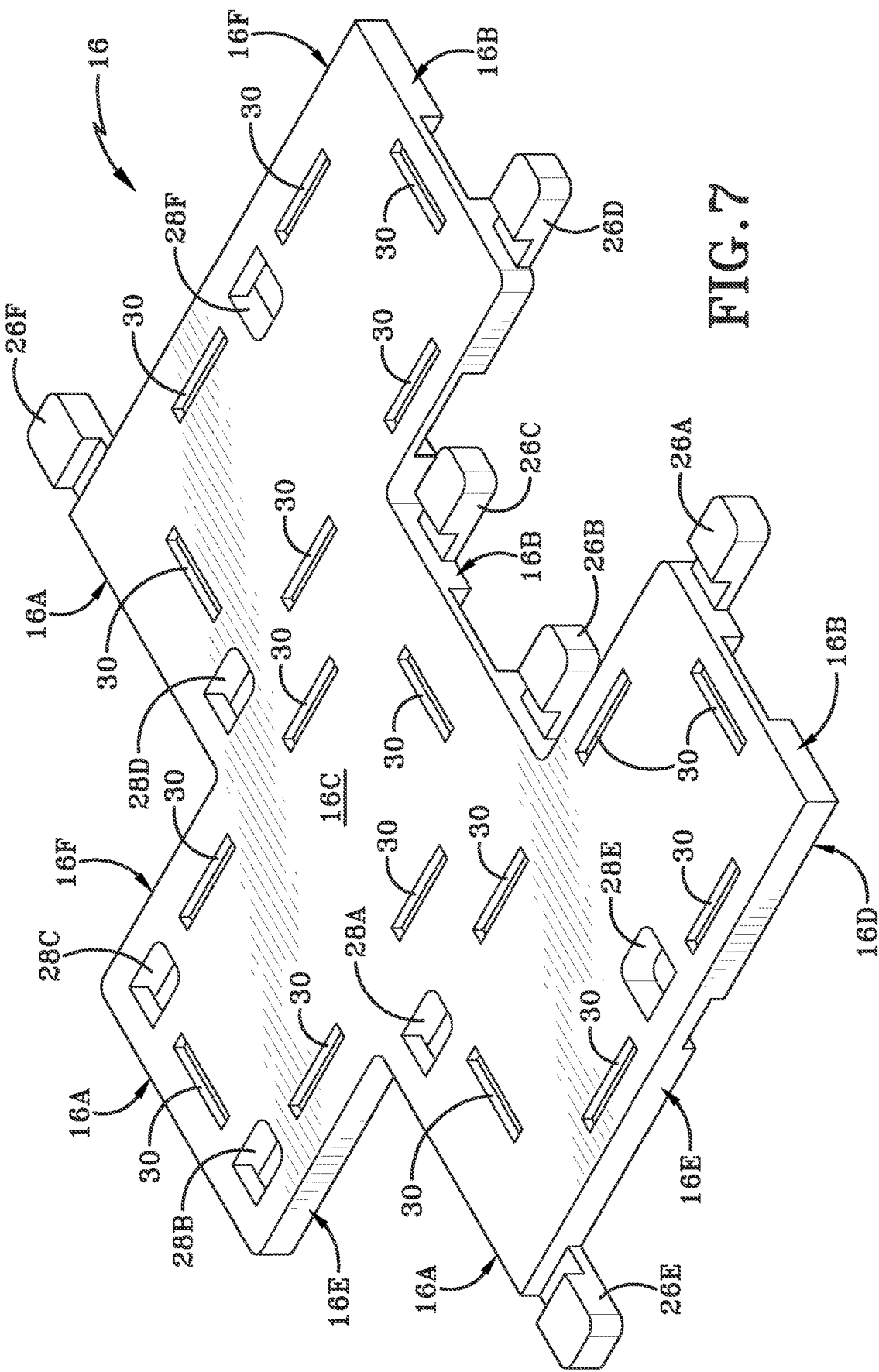
FIG. 7 (FIG. 7) is an isometric top perspective view of a bottom plate of the modular piece.
Figure 8:
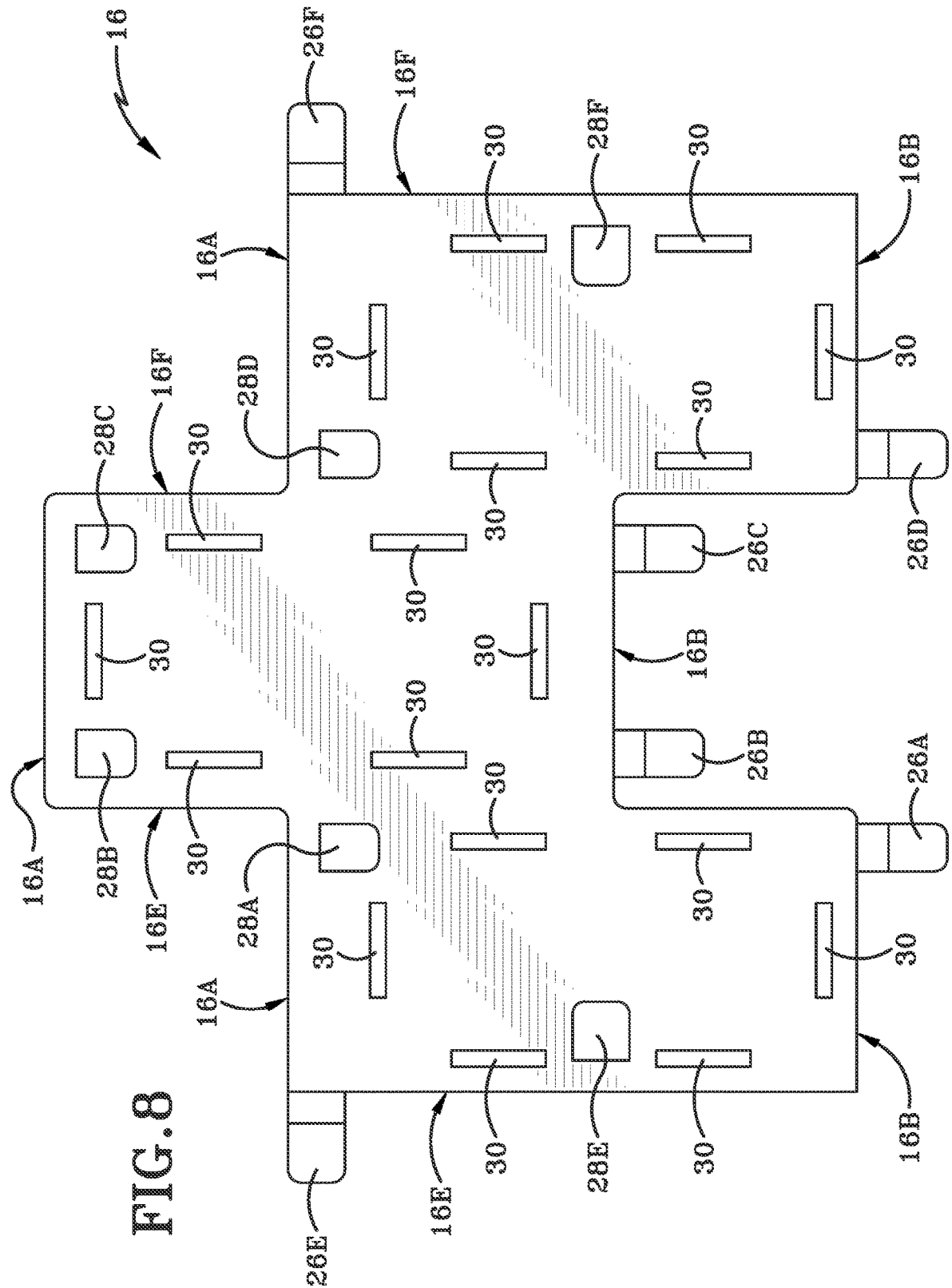
FIG. 8 (FIG. 8) is a top plan view of the bottom plate of the modular piece.

Referring now to FIG. 7, FIG. 8, FIG. 9, and FIG. 10, the bottom plate 16 is shown. Referring specifically to FIG. 7, a top perspective view is shown. Shown in this view are the apertures 28 including the four 28A, 28B, 28C 28D on the front side face 18A of the bottom plate 16, as well as the one 28E aperture on the first side 16E and the one 28F aperture on the second side 18F. The apertures 28 are generally U shaped and are oriented for the top of the U to be towards the face or the side for which they are associated. The top 16C of the bottom plate 16 is substantially smooth with the through holes 30 located throughout.

Figure 9:
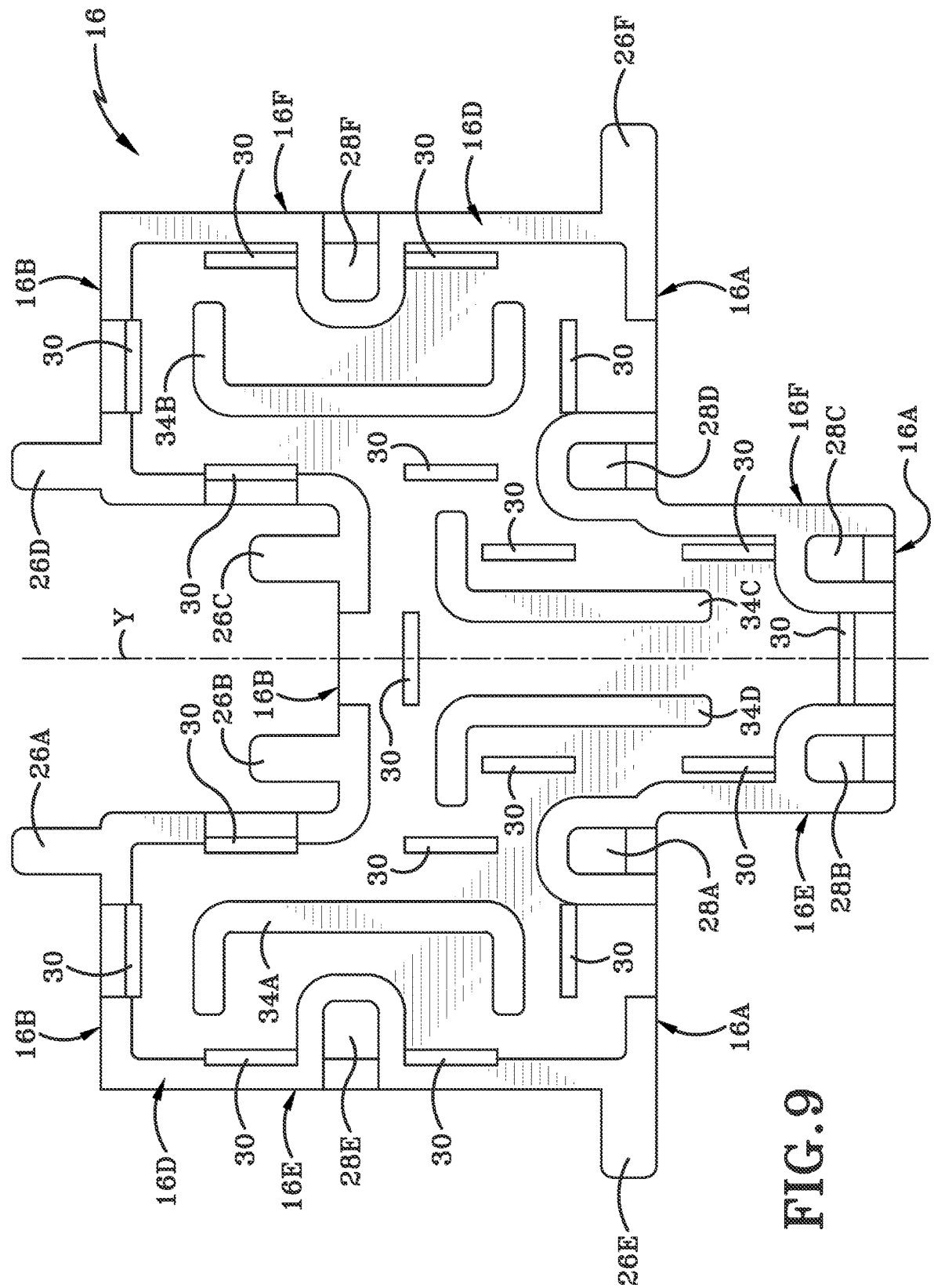
FIG. 9 (FIG. 9) is a bottom plan view of the bottom plate of the modular piece.
Figure 10:
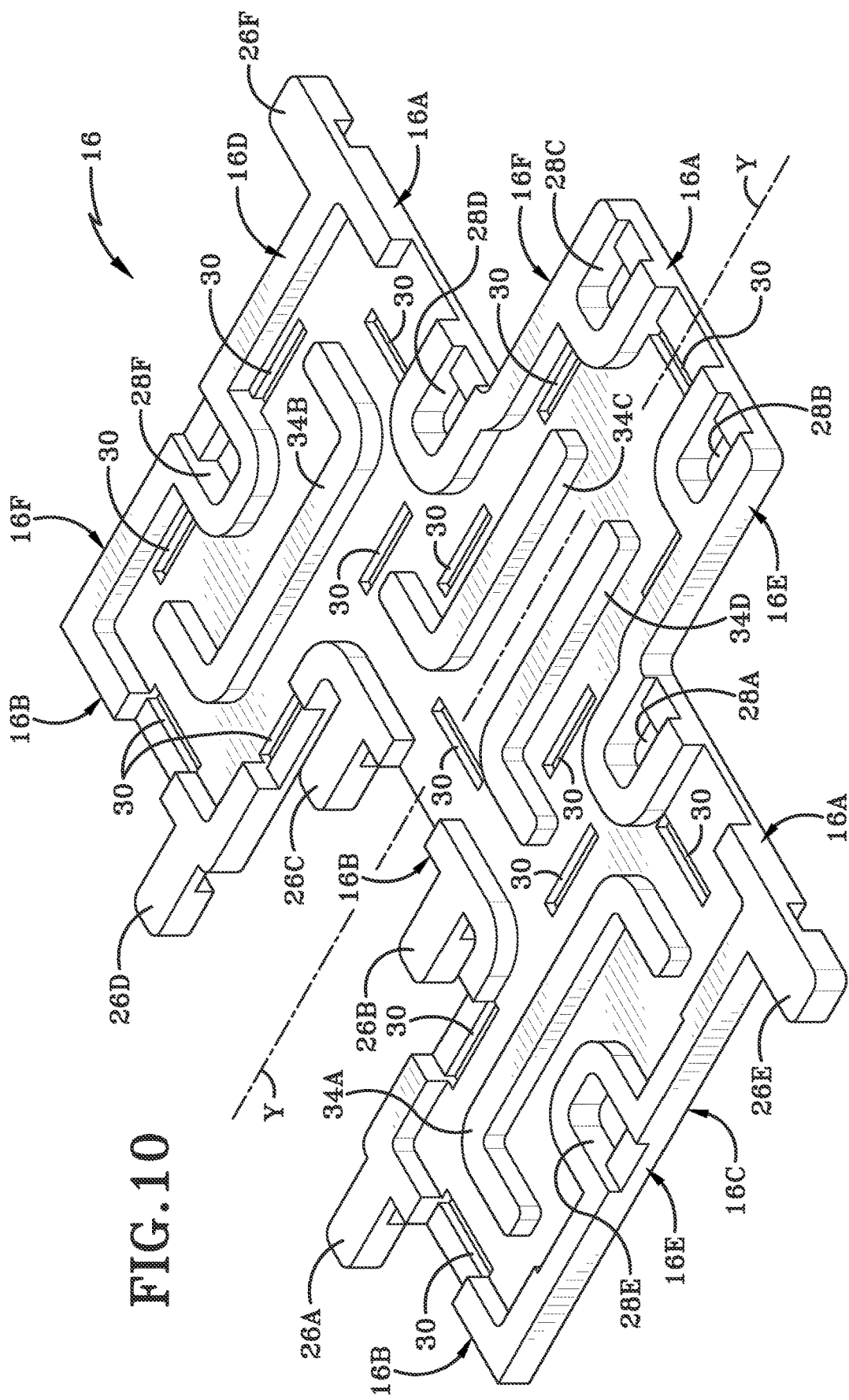
FIG. 10 (FIG. 10) is a bottom isometric perspective view of the bottom plate of the modular piece.

Referring specifically to FIG. 9 and FIG. 10, the bottom 16D of the bottom plate 16 is shown. Within this view four separate directors 34 are shown. Two of the directors 34A and 34B have elongated bottom U shapes. The first director 34A is located on near the first side 16E but spaced laterally away from it while the second director 34B is located near the second side 16F. The third and fourth directors 34C, 34D are located proximate the longitudinal axis Y and are generally L-shaped when viewed from the front in the case of 34C, or inverted L-shaped in the case of 34D. These directors are mirror images of one another if the device 10 was folded along the longitudinal Y-axis.

Figure 11:
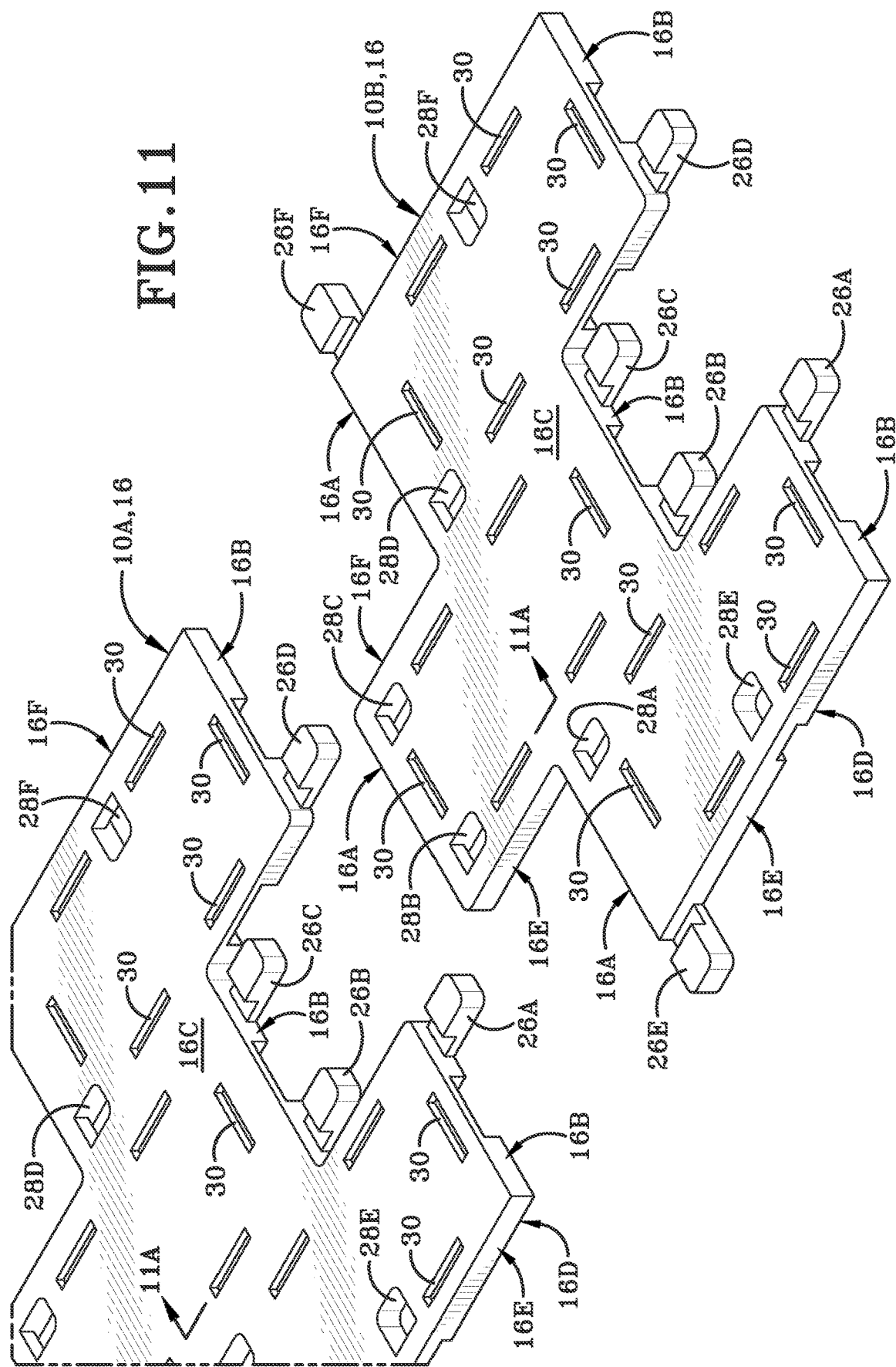
FIG. 11 (FIG. 11) is an isometric perspective view of two bottom plates aligned with each other.
Figure 11A:
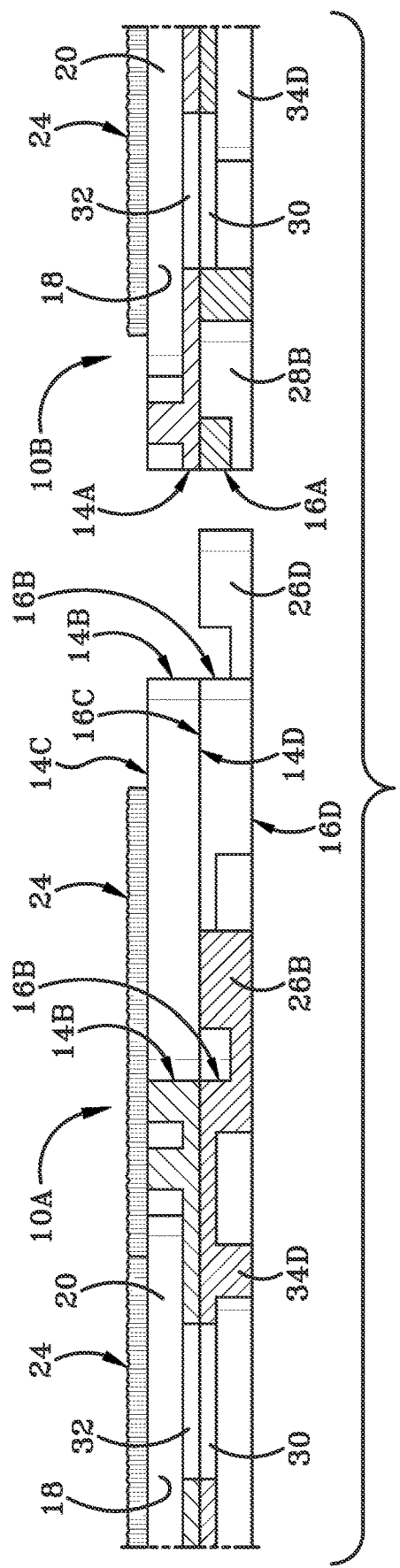
FIG. 11A (FIG. 11A) is a side section view along line 11A-11A in FIG. 11 of two modular pieces aligned with one another.
Figure 12A:
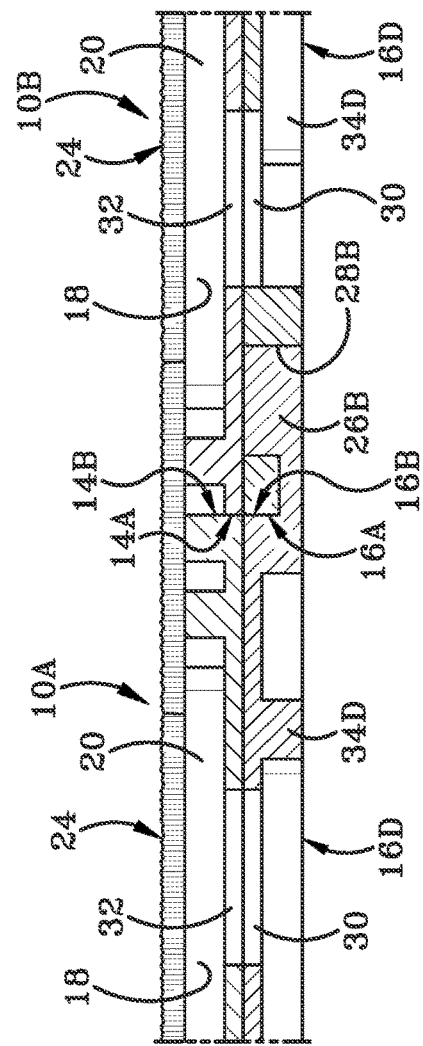
FIG. 12A (FIG. 12A) is a side section view along line 12A-12A in FIG. 12 of two modular pieces engaged with one another.
Figure 12:
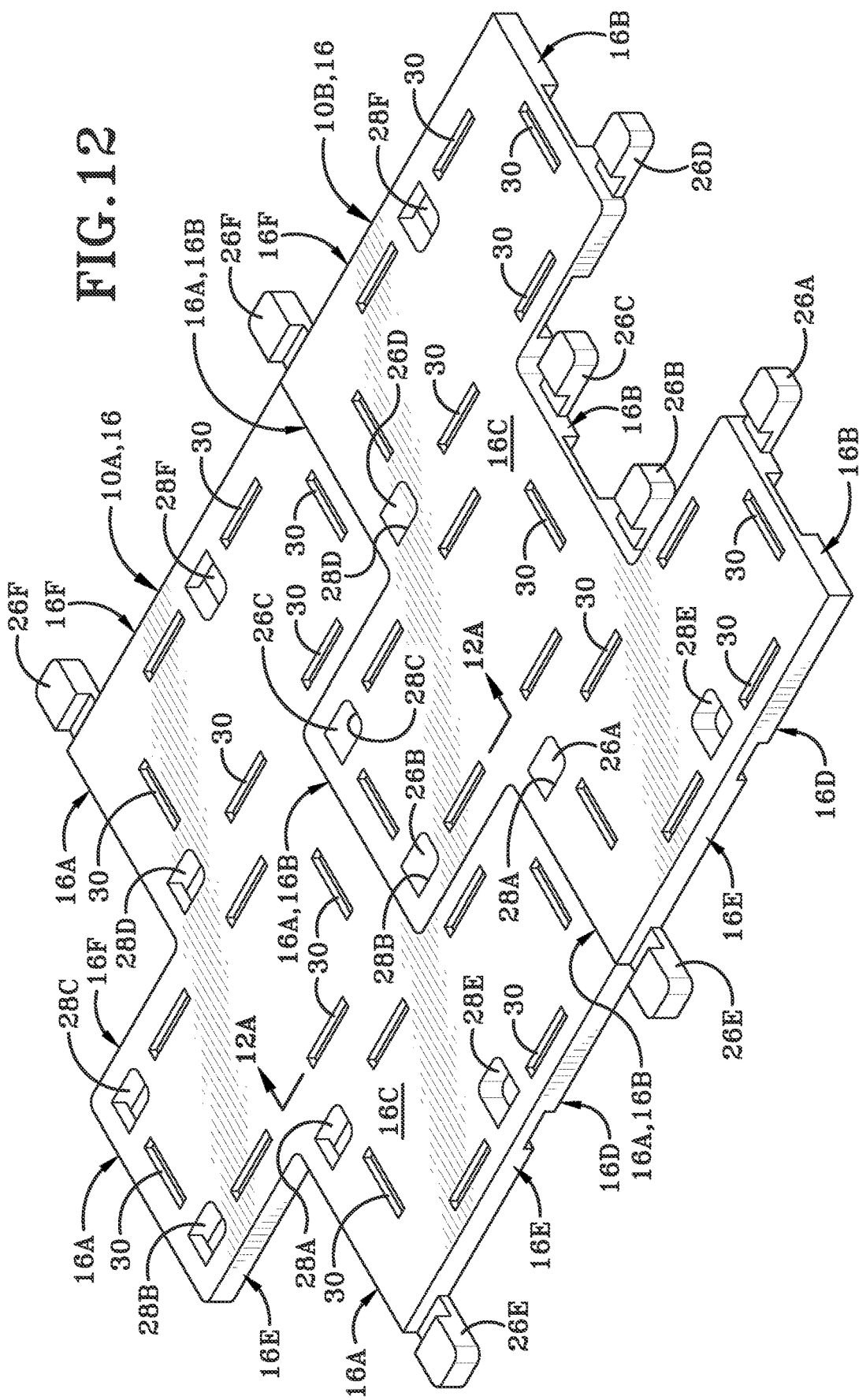
FIG. 12 (FIG. 12) is an isometric perspective view of two bottom plates engaged with each other.

Having now described the structure of the device 10 and the various components and connections thereof within the device, a method of use and assembly therefor will now be described. Referring now to FIG. 11, FIG. 11A, FIG. 12, and FIG. 12A, an exemplary engagement of two pieces 10 is shown. Referring specifically to FIG. 11, the individual pieces 10 are positioned so that the tabs 26 of a first piece 10A are aligned with the apertures 28 of a second piece 10B. In this view, tab 26A is aligned with aperture 28A, tab 26B is aligned with 28B, tab 26C is aligned with aperture 28C, and tab 26D is aligned with aperture 28D. This may further be seen within the cross section of FIG. 11A. After alignment of the tabs 26 with their respective apertures 28, the pieces 10A and 10B are moved toward one another and the tabs 26 will be allowed to engage with the apertures 28 and nest therein. Two pieces of tile, namely the first piece 10A and second piece 10B are abutted. After, abutting in order to engage the tab 26 and aperture 28 shape with one another, a tilting of one or both pieces will help to facilitate engagement. In an exemplary embodiment, the first piece 10A or second piece 10B may be tilted at an angle less than 90 degrees from its normal position is brought to abut with a portion of the top plate 14C in contact with the second piece 10B at its front 16A. The first piece 10B may then be rotated back about the angle to allow facilitation of the tab 26 to engage with the aperture 28. As a result, the first piece 10A and second piece 10B are in operative engagement with one another and may resist forces acting on either piece to remain in operative contact with one another. This process may be repeated as much as possible with a third, fourth and nth piece (not shown) to build any desired shape by a user.

Additionally, though not shown, the tab 26E may engage with the aperture 28F and the tab 26F may engage with the aperture 28E and the system may be assembled in a manner orthogonal to the Y-axis and built out in a similar manner. This would occur by abutting the sides of the pieces, tilting at least one of the tiles at an angle less than 90 degrees, rotating the tile that was tilted back to its normal position and engaging the tab with the aperture 28 and repeating this action to build out in an orthogonal manner.

Figure 13:
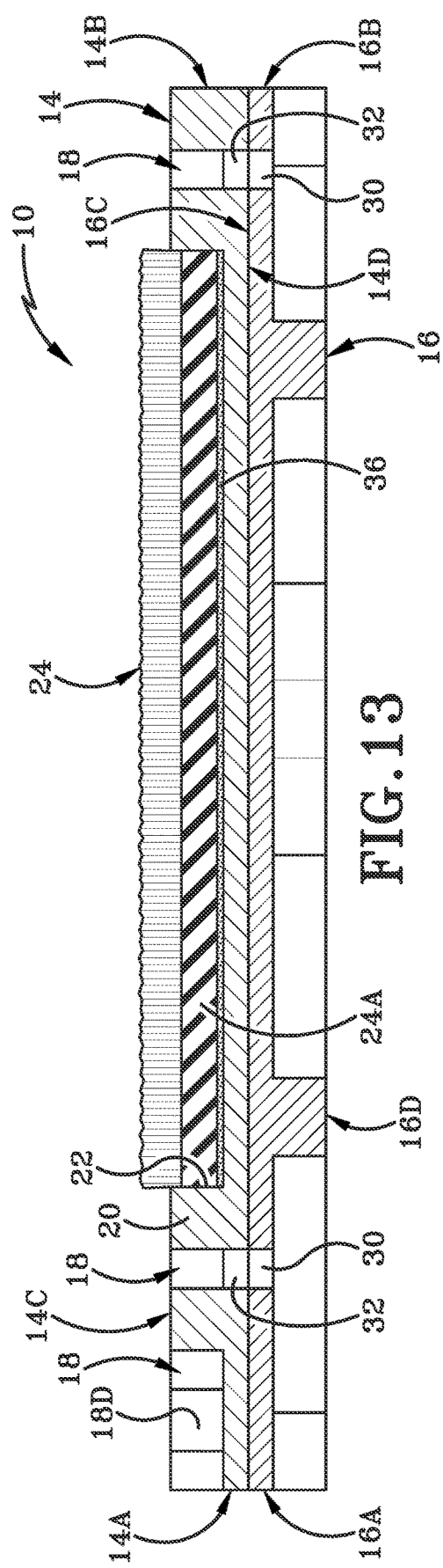
FIG. 13 (FIG. 13) is a side section view showing an insert engaged with the top portion with adhesive placed onto a tile.
Figure 14:
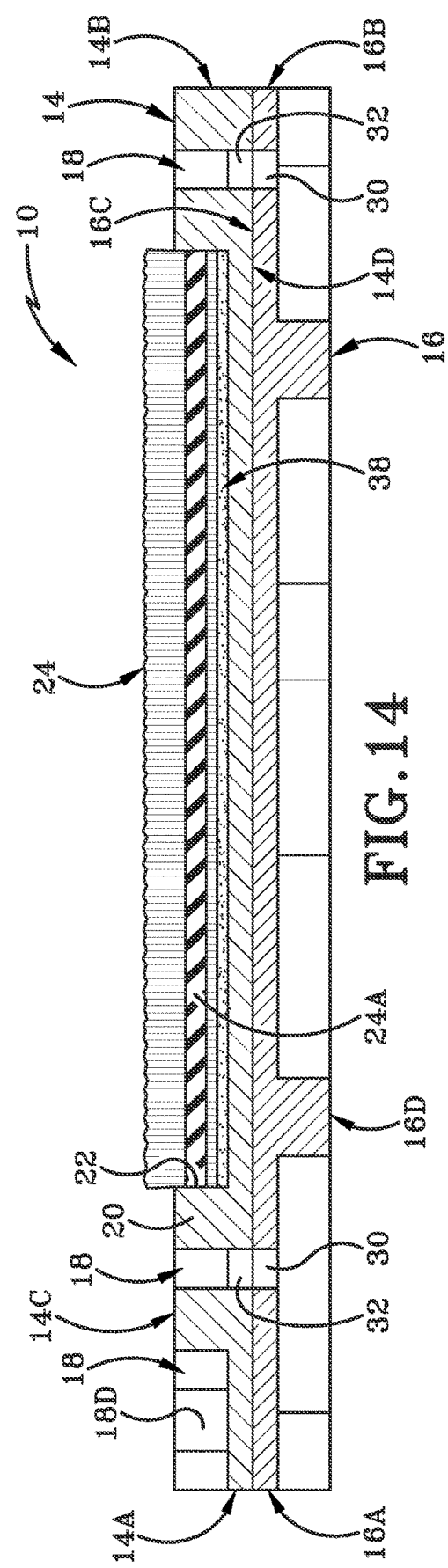
FIG. 14 (FIG. 14) is a side section view showing the insert engaged with the top portion via a hook and loop configuration on the tile.

Referring now to FIG. 13 and FIG. 14, exemplary cross sections of the insert accepting area 22 and insert 24 with surrounding areas are shown. Referring specifically to FIG. 13, the bottom 24A of the insert 24 may be attached through any method of known ways. Included in this as shown in FIG. 13 is adhesive 36. The bottom 24A of the insert or the insert accepting area 22 are coated with an adhesive to allow the bottom 24A to be in operative engagement, prohibiting movement of the insert with respect to the insert accepting area 22. An alternative embodiment is shown in FIG. 14, where a hook and loop fastener 38 may be implored as an alternative to the hook and loop configuration. As such, the bottom 24A of the insert 24 would outfitted with the hook material attached via an adhesive 36 and the insert accepting area 22 would be outfitted with the loop material and the loop material would be attached to the insert accepting area via an adhesive 36.

Additionally, in an alternative embodiment, the bottom 24A of the insert would be outfitted with the loop material attached via an adhesive and the insert accepting area 22 would be outfitted with the hook material and the hook material would be attached to and operatively engaged with the insert accepting area via an adhesive. In a further alternative embodiment, the insert 24 may be affixed by the factory prior to being installed.

Referring now to FIG. 15, a section view along line 15-15 in FIG. 1 of a perimeter drain 38 below the assembled floor mat 12 is shown. The through holes 30 on the bottom plate 16 and the through holes 32 on the top plate 14 are aligned and operative to wisp away fluids and small solids from an individual's shoes or other such platform as indicated by the flow of arrows into the perimeter drain 38 below. As a result, of the channels 18 and channel exits 18A, 18B, 18C, 18D, 18E, 18F, 18G, 18H, 18J, water or other such liquid will not be able to pool on the top 14C of the top plate 14. It will be routed through the through holes 30, 32, into the perimeter drain 38 below. Both the top plate 14 and bottom plate 16 are made of flexible materials in order to bend, but not break under loads, while removing water and other moisture from the top surface 14C of the top plate 14.

Various different inserts 24 are contemplated depending on the use of the assembly 12. For example, for a store front with a lot of foot traffic, an abrasive carpet may adequately clean and remain viable for removing liquid. In a more industrialized application a gel or rubber insert may be used as it will deform under heavier loads while maintaining structural integrity. Inserts may also be mixed and matched depending on different uses. If at any time an insert 24 breaks or otherwise becomes not viable for its application, the insert 24 may be removed from the insert accepting area 22 and replaced with a new insert 24. This may be done as well by observing a different color, or indicator layer, of the interior area 22.

Referring now to FIG. 16A, FIG. 16B, FIG. 16C, FIG. 16D, and FIG. 16E, additional shapes of alternative embodiments of further pieces 110, 210, 310, 410, 510 are shown. At times, if the assembled floor 12 is desired to be of a perfect square or rectangular shape, other pieces rather than the base piece 10 may be needed. These other pieces are designed in a substantially similar way, including a top plate 14 and a bottom plate 16, except that their tabs 26 and apertures 28, may be varied amongst different sides depending on the end result. These pieces work identically with respect to their abutment, tilting, rotating, and engaging of tab portions and apertures, merely located at different locations with respect to the base piece 10. Though, all of these further shapes interface in a substantially similar manner as described above with respect to the base piece 10.

Figure 16A:
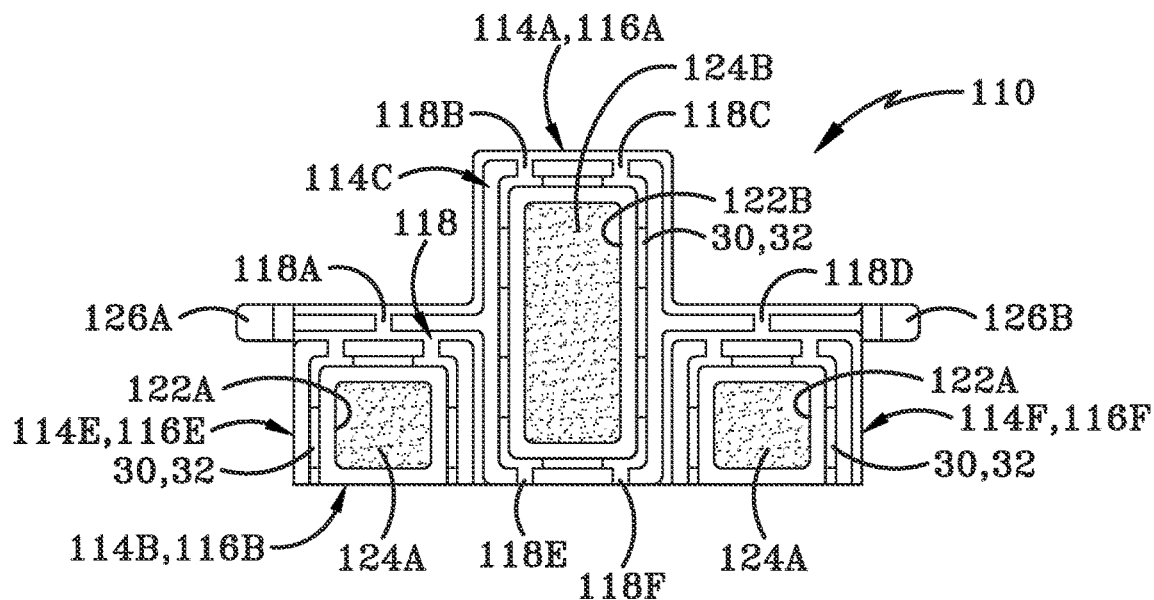
FIG. 16A (FIG. 16A) is an alternative embodiment of a modular piece.

Referring specifically to FIG. 16A, piece 110 is shown in a top plan view. Piece 110 is generally identical in construction to piece 10, with the exception of its shape and corresponding features. There are a series of channels 118 terminate at a front side face 114A of the top plate 114 with four channel exits 118A, 118B, 118C, 118D along with a back side face 114B channel exits 118E, 118F. The channels 118 bound different sized insert accepting areas 122 where two are smaller area 122A and one is of the same size as 22, area 122B from the first piece 10. As a result, the inserts 124 are also of different sizes 124A, 124B. Further, a first tab 126A is on a first side 116E of a bottom plate 116 and a second tab 126B is on a second side 116F of the bottom plate 116. The bottom plate 116 contains similar apertures to the bottom plate 16, just merely in their locations, per the shape of the piece 110. The through holes 30, 32 remain the same between all of the piece embodiments.

Figure 16B:
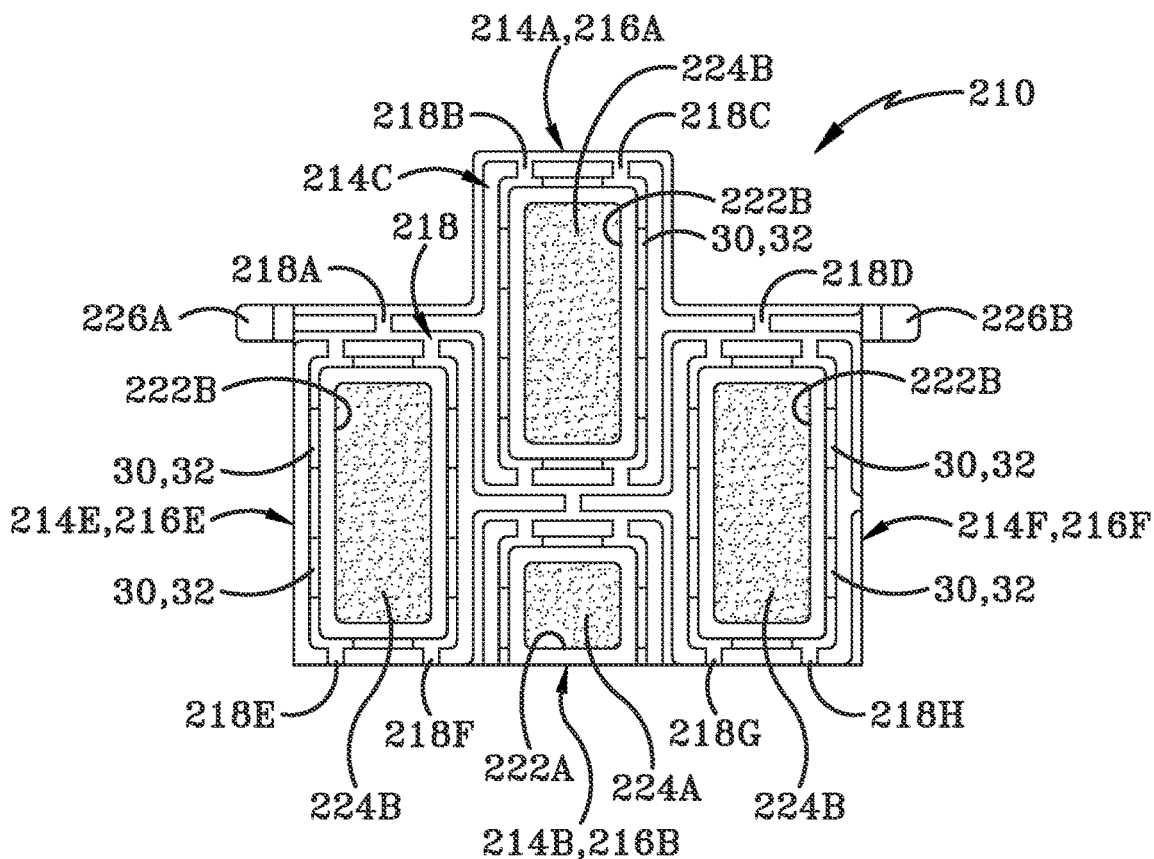
FIG. 16B (FIG. 16B) is a further alternative embodiment of a modular piece.

Referring specifically to FIG. 16B, piece 210 is shown in a top plan view. Piece 210 is generally identical in construction to piece 10 and 110, with the exception of its shape and corresponding features. There are a series of channels 218 that terminate at a front side face 214A of the top plate 214 with four channel exits 218A, 218B, 218C, 218D along with a back side face 214B with channel exits 218E, 218F, 218G, 218H. The channels 218 bound different sized insert accepting areas 222 where there is one smaller area 222A and three larger areas 222B, where the larger areas are the same size as the insert 24 from the first embodiment 10. Further, a first tab 226A is on a first side 226E of the bottom plate 216 and a second tab 226B is on a second side 226F of the bottom plate 226. The bottom plate 216 contains similar apertures to the bottom plate 16 just merely different in their locations, per the shape of the piece 210.

Figure 16C:
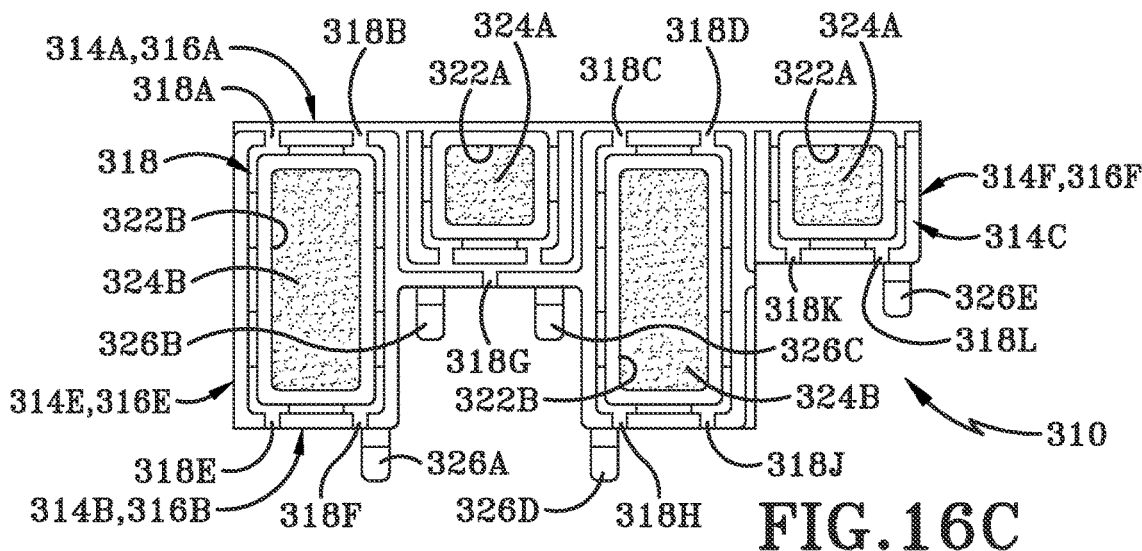
FIG. 16C (FIG. 16C) is a further alternative embodiment of a modular piece.

Referring now to FIG. 16C, piece 310 is shown in a top plan view. Piece 310 is generally identical in construction to piece 10, 110, and 210, with the exception of its shape and corresponding features. There are a series of channels 318 that terminate at a front side face 314A of the top plate 314 with four channel exits 318A, 318B, 318C, 318D along with a back side face 314B with channel exits 318E, 318F, 318G, 318H, 318J, 318K, 318L, 318M. The channels 318 bound different sized insert accepting areas 322 where there are two smaller areas 322A and two larger areas 322B, where the larger areas are the same size as the insert 24 from the first embodiment. Further, a plurality of tabs 326 are shown on the back side 316B of the bottom plate 316 including the tabs 326A, 326B, 326C, 326D, 326E. The bottom plate 316 contains similar apertures to the bottom plate 16 merely different in their locations, per the shape of the piece 310.

Figure 16D:
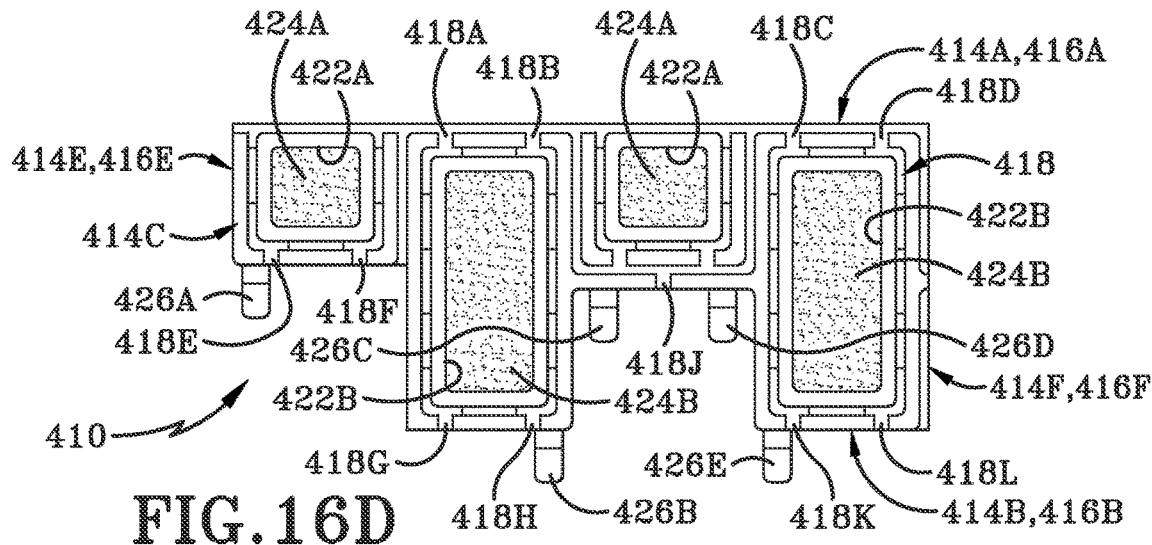
FIG. 16D (FIG. 16D) is a further alternative embodiment of a modular piece.

Referring now to FIG. 16D, piece 410 is shown in a top plan view. Piece 410 is generally identical in construction to piece 10, 110, 210, and 310, with the exception of its shape and corresponding features. There are a series of channels 418 that terminate at a front side face 414A of the top plate 414 with four channel exits 418A, 418B, 418C, 418D along with channels along a back side face 414B with channel exits 418E, 418F, 418G, 418H, 418J, 418K, 418L. The channels 418 bound different sized insert accepting areas 422 where there are two smaller areas 422A and two larger areas 422B, where the larger areas 422B are the same size as the insert 24 from the first embodiment. Further, a plurality of tabs 426 are shown on the back side 416B of the bottom plate 416 including the tabs 426A, 426B, 426C, 426D, 426E. The bottom plate 416 contains similar apertures to the bottom plate 16 merely different in their locations, per the shape of the piece 410.

Figure 16E:
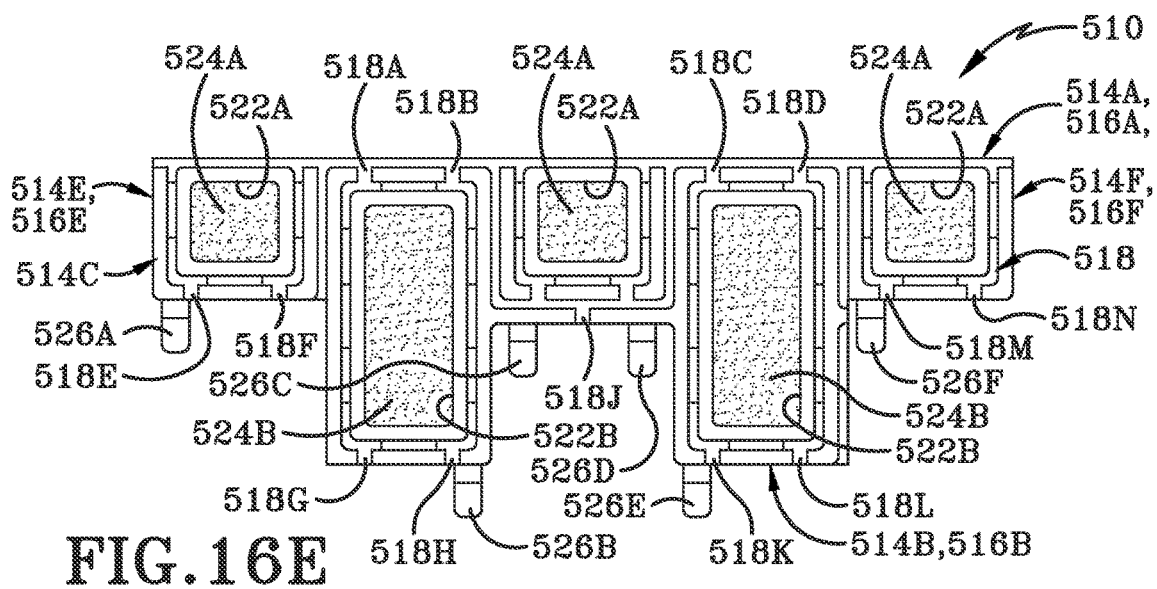
FIG. 16E (FIG. 16E) is a further alternative embodiment of a modular piece.

Referring now to FIG. 16E, piece 510 is shown in a top plan view. Piece 510 is generally identical in construction to piece 10, 110, 210, 310, and 410, with the exception of its shape and corresponding features. There are a series of channels 518 that terminate at a front side face 514A of the top plate 514 with four channel exits 518A, 518B, 518C, 518D along with channels along a back side face 514B with channel exits 518E, 518F, 518G, 518H, 518J, 518K, 518L, 518M, 518N. The channels 518 bound different sized insert accepting areas 522 where there are three smaller areas 522A and two larger areas 522B, where the larger areas 522B are the same size as the insert 24 from the first embodiment. Further, a plurality of tabs 526 on the back side 516B of the bottom plate 516 including the tabs 526A, 526B, 526C, 526D, 526E, 526F. The bottom plate 516 contains similar apertures to the bottom plate 16, merely different in merely different in their locations, per the shape of the piece 510.

As a result, the assembled system 12 may be built out in a variety of patterns. If at any time any piece 10, 110, 210, 310, 410, 510 were to break or become nonfunctional, it may be replaced and reengaged with the surrounding pieces. As a result, the system is fully modular and may be pieced together to form one cohesive system 12.

Once the system 12 is set into place, users will walk over it. As the users walk over the system 12, dirt, fluids and other detritus will be removed by the system 12, specifically the inserts 22 and their materials. The inserts 22 may knock the dirt or other detritus free of the surfaces, as well as wisping water away from the surfaces ran across the system 12. The wisped water may be directed by the channels 18 to the through holes 30, 32 and pass to any drain. However, because these piece may be made from a carpet like material or gel like material and they are making contact with shoes and bottom surfaces of transports like shopping carts, pallet jacks and the like, it is best for them to be made of a soft material to adequately clean and wisp away particulates.

However, the drawback to using soft materials is that they tend to wear out at a much faster rate than harder materials. As a result, the indicator layer within the interior area 22 may be exposed due to wear and tear, or the different color of the second plate may be seen as well. Portions of the system 12 are likely not to wear at the same speed. As a result, individual inserts 22 as well as individual pieces 10 are able to be replaced.

Many times, in situations where there is a need to replace any portion of prior art systems, the space all around the system must be entirely closed. Many of these systems are located in entry or exit ways at retail establishments. As such, customers may be turned away, heavily inconvenienced, or annoyed by closure of such entry or exit. In such establishments that are open around the clock, interruption of service during replacement of varying prior art systems is inevitable, leading to a loss of business.

Further, for the owner or operator of the retail establishment, if not open around the clock, desires to minimally inconvenience their patrons must schedule the repair at a time prior to open or after close. Many of these times are considered off hours for repairmen incurring double or even triple their normal fees, not to mention the likely excess pay for an employee to supervise the work outside of normal business hours.

Therefore, it is a feature of the system 12 to be fully modular in that a single insert 24 or a single piece 10 may be replaced at the first sign of wear and tear or failure. The simple interlocking feature of the system 12 along with the easy replaceability of the inserts 22 allows for minimal down time. Untrained individuals may quickly be able to comprehend the shape and structure of the pieces 10 and understand how it may operatively connect in order to replace fractured or otherwise broken piece 10. Further, at a sign of wear and tear the insert 24 may be replaced in a similar expedited manner allowing for minimal down time, with possibly none depending on the size of the system 12.

Further, in an exemplary embodiment a system 12 may be built out to be virtually any shape that is desired by a consumer. Prior to any system 12 being laid, there would be a section of surface that would be further recessed. This depth of the recessed section would allow for a floor drain to be installed. The recessed section may be built into any desired shape. Common shapes may include, but are not limited to squares, rectangles, rhombuses, trapezoids, triangles, kites, diamonds, plus symbols, pentagons, hexagons, octagons, decagons, though any and all two dimensional shapes are contemplated. In the exemplary embodiment there would not be a need for a floor drain, but instead the perimeter drain 38. The perimeter drain 38 would be operative to trace the perimeter of whatever desired shape of the system 12 was constructed.

As a result, a normal floor of whatever desired type may be laid everywhere except the recessed section, or an area traced by a perimeter drain. In certain embodiments, within the recessed section or area covered by a perimeter drain a structural support may be included. The structural support may be a scaffold like or frame type support. In other embodiments the structural support may not be needed as the system may be able to self-support itself, depending on size of the assembled structure.

Further, the mat system 12 may be built in various two dimensional shapes to incorporate custom designs including but not limited to logos, signage or other identifying indicia. As a result, multiple colors of top plates 14 may be used in order to build out a custom design while maintaining a different color of a bottom plate 16 along with the insert accepting area 22 and insert 24. As a result, the indicator layers would be specific colors unique to not be colors of an end user's design a so as to still properly act as an indicator layer.

In some embodiments, a single piece 10 may be made formed as a unitary element using a multi-shot injection molding technique. Multi-shot injection molding refers to creation of multiple layers relative to the starting axis of the initial mold. In other words, a warm, heated material is inserted into the mold followed by additional materials in a very specific sequence, one after another. This sequential addition of materials provides a layering effect between the materials while maintaining relatively high-energy interactions at the material boundaries. This generally results in stronger inter-layer bonds when compared to when the layers are applied to a previously cooled part, as is more often the case of over-molding type of injection molding.

Referring specifically to FIG. 17-FIG. 26B, a diagrammatic process for forming a single piece 10 is shown. Specifically, referring to FIG. 17, a top front left isometric perspective operational view of an exemplary method of manufacturing the modular mat piece with an exemplary injection molding apparatus 600 in a first position is shown. The exemplary injection molding apparatus 600 is shown in part, namely the mold portion 602 with a first side 602A and a second side 602B. The exemplary molding apparatus 600 has two mold sections on the first side 602A, a first section 604, and a second section 606. The first section 604 and second section 606 are identical to each other.

Figure 17:
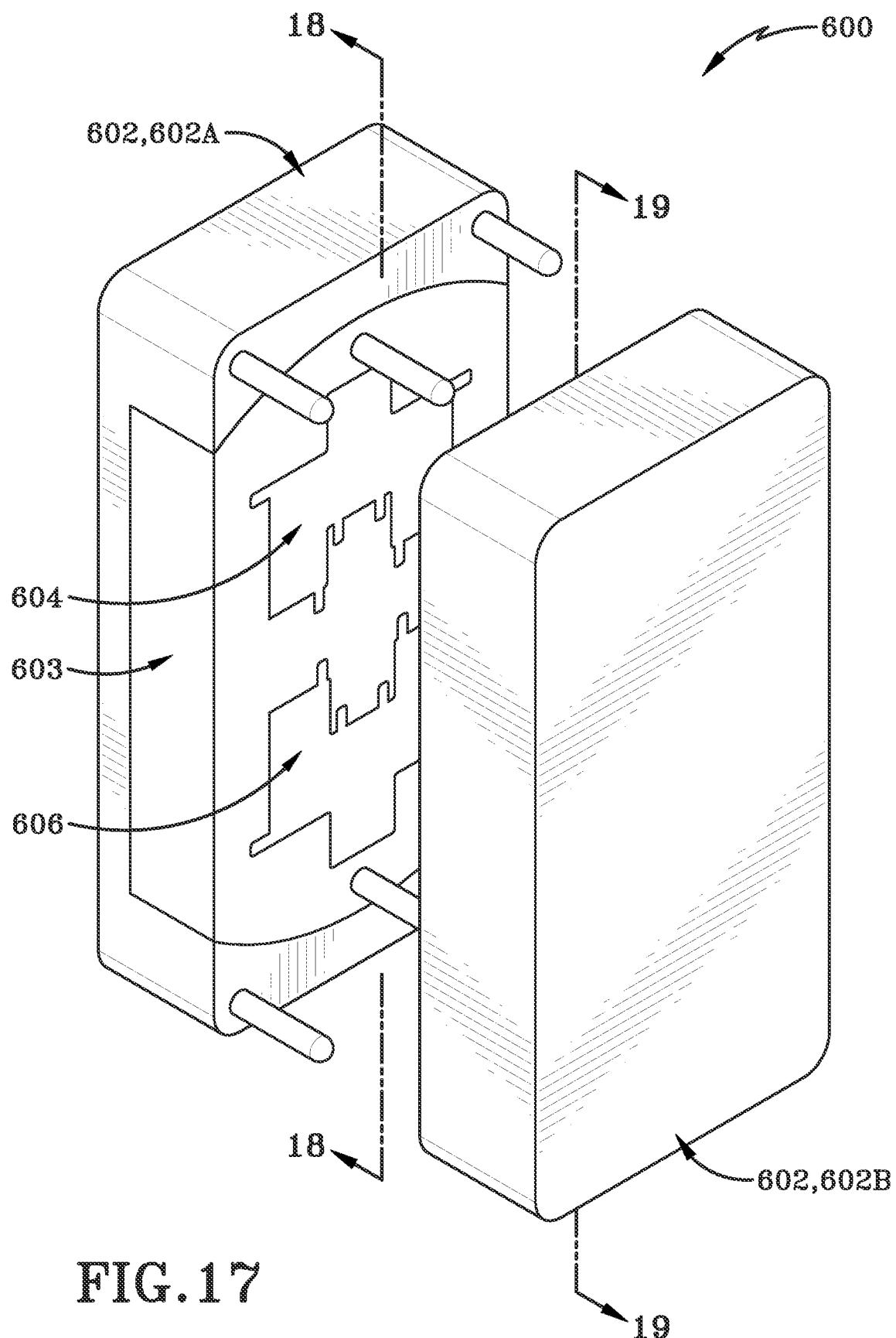
FIG. 17 (FIG. 17) is a top front left isometric perspective operational view of an exemplary method of manufacturing the modular mat piece with an exemplary injection molding apparatus in a first position.
Figure 18:
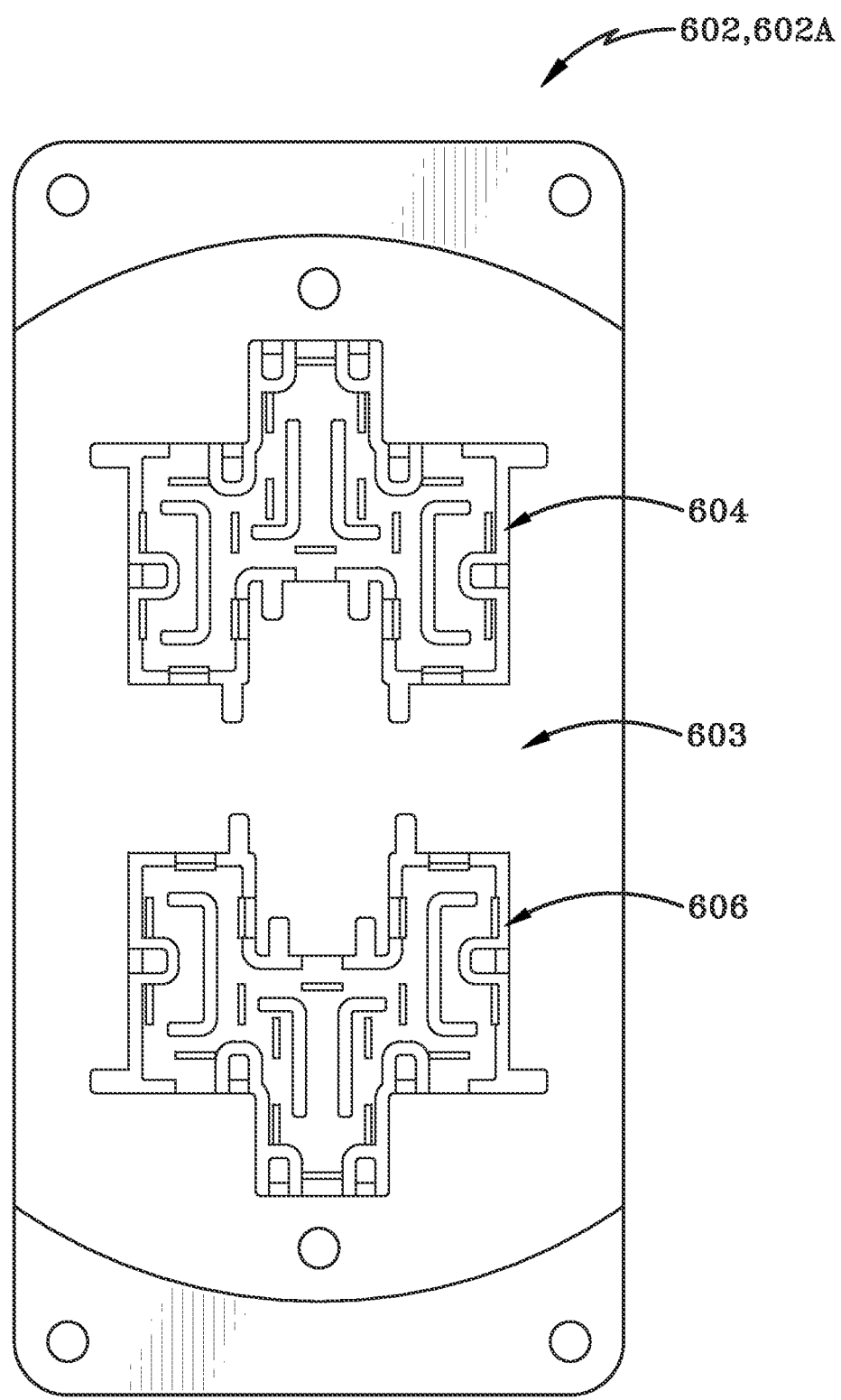
FIG. 18 (FIG. 18) is an elevation view looking in the direction of line 18-18 of FIG. 17.
Figure 19:
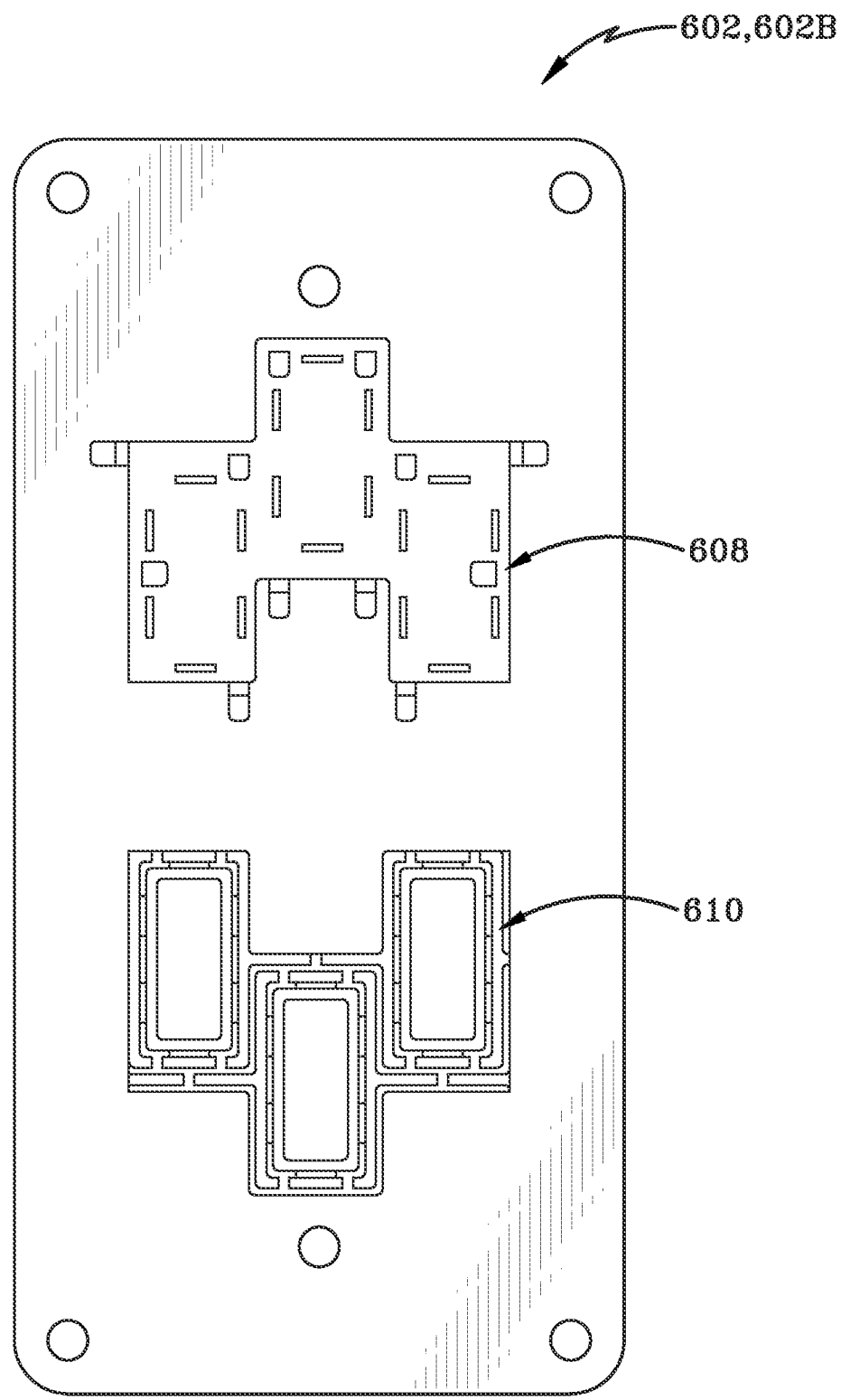
FIG. 19 (FIG. 19) is an elevation view looking in the direction of line 19-19 of FIG. 17.

Referring specifically to FIG. 18, an elevation view along line 18-18 of FIG. 17 is shown. This elevation view shows the first section 604 and second section 606 are identical to one another. Both the first section 604 and the second section 606 are operative to make the second plate 16. While when referring to FIG. 19, an elevation view along line 19-19 of FIG. 17 is shown. In this view, one can see the second side 602B containing a third section 608 and a fourth section 610. The third section 608 is operative to form the top side 16C of the second plate 16 while the fourth section 610 is operative to form the first plate 14.

Figure 20:
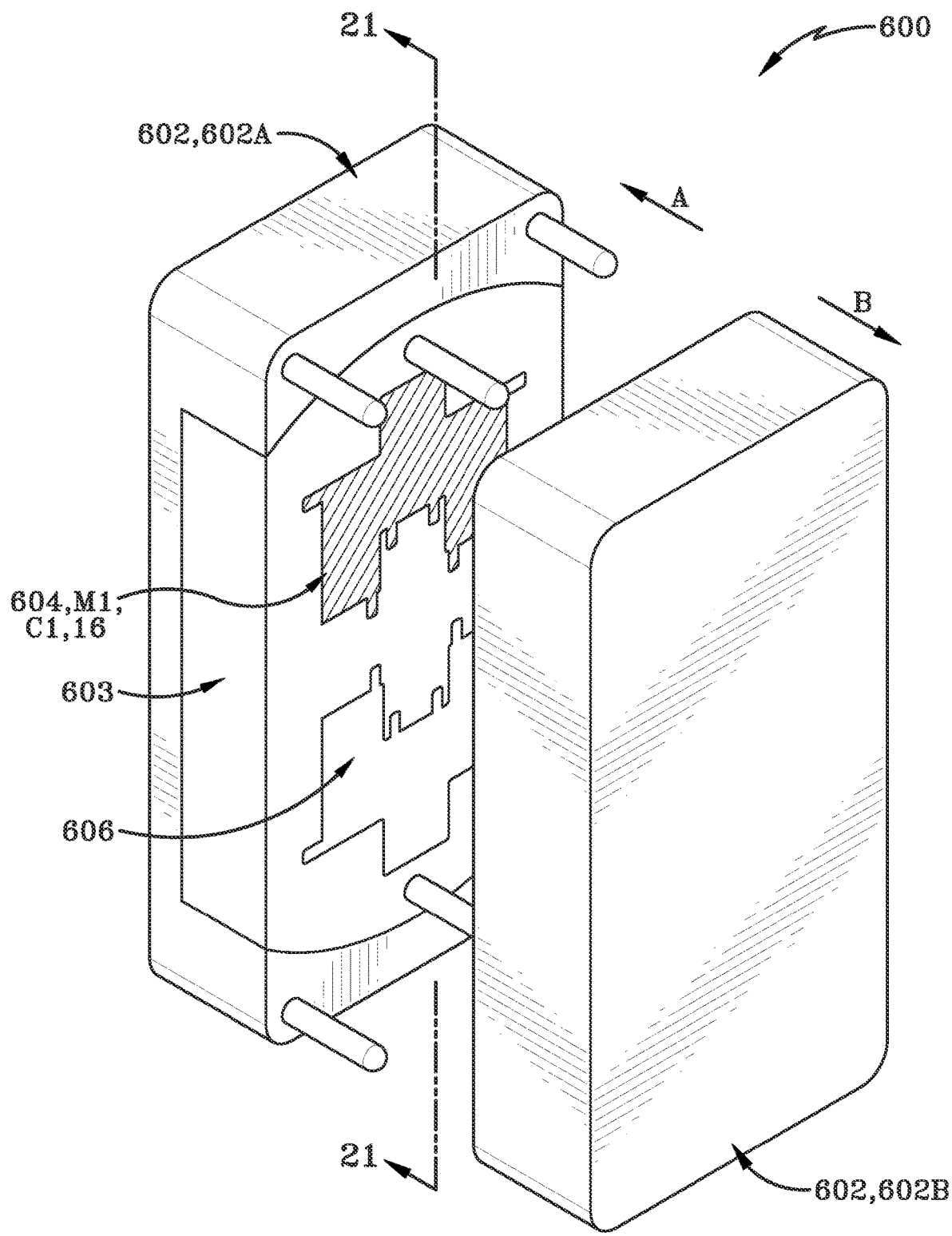
FIG. 20 (FIG. 20) is a further top front right isometric perspective operational view of the exemplary method of manufacturing the modular mat piece with the exemplary injection molding apparatus partially filled in a first position.
Figure 21:
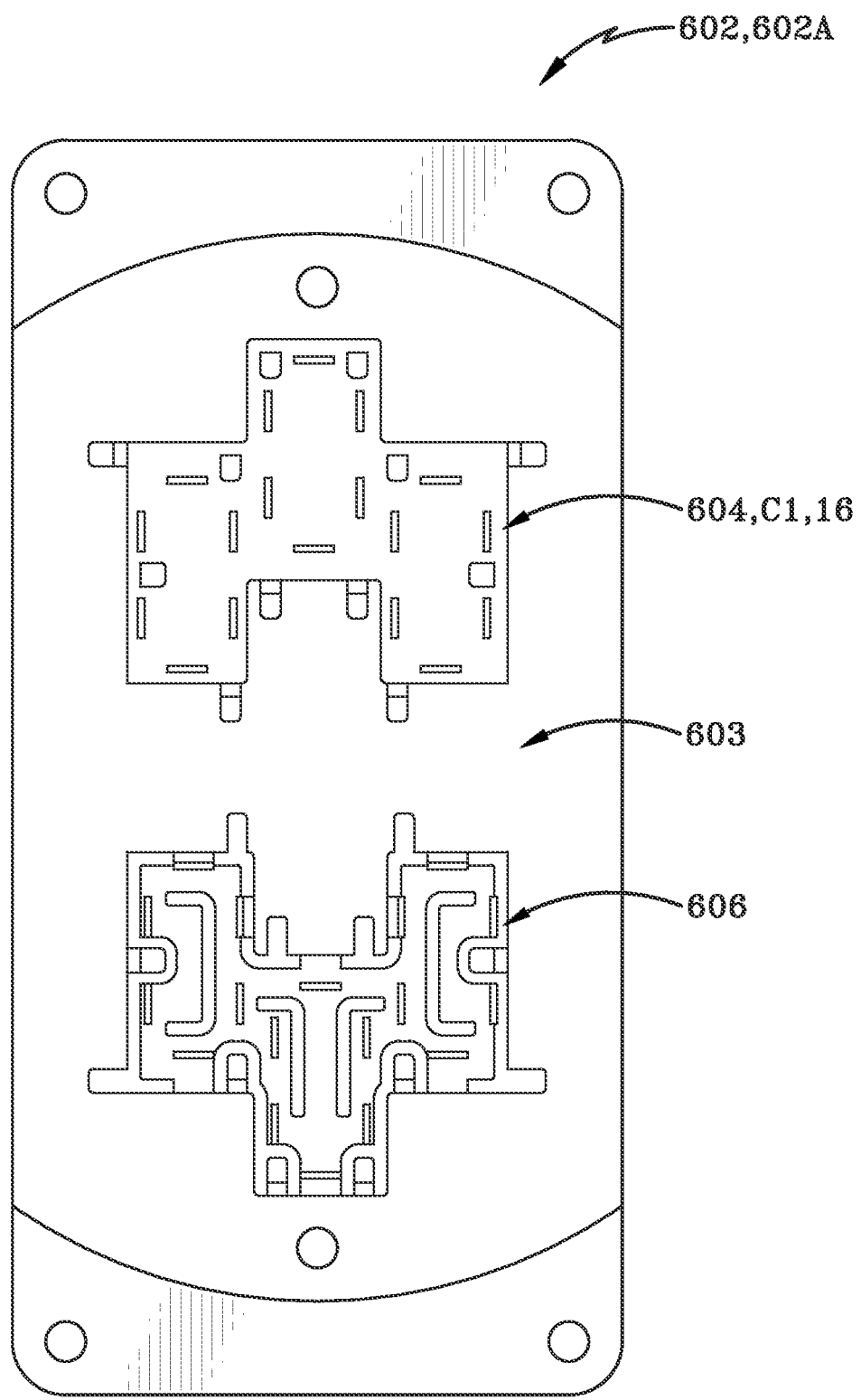
FIG. 21 (FIG. 21) is an elevation view looking in the direction of line 21-21 of FIG. 20.

Referring specifically to FIG. 20, the second side 602B moves first in a first direction "A" in order to compress the material after the first section 604 has been filled or shot with a molten first material M1. After the first section 604 and third section 608 has been filled with a first molten material M1 the second side 602B moves in a second direction "B" once the second plate 16 is formed in order to disengage the first side 602A with the second side 602B. As can be seen in FIG. 21, this movement of them old portion results in a first cured material "C1" comprising the second plate 16 within the first section 604.

Figure 22:
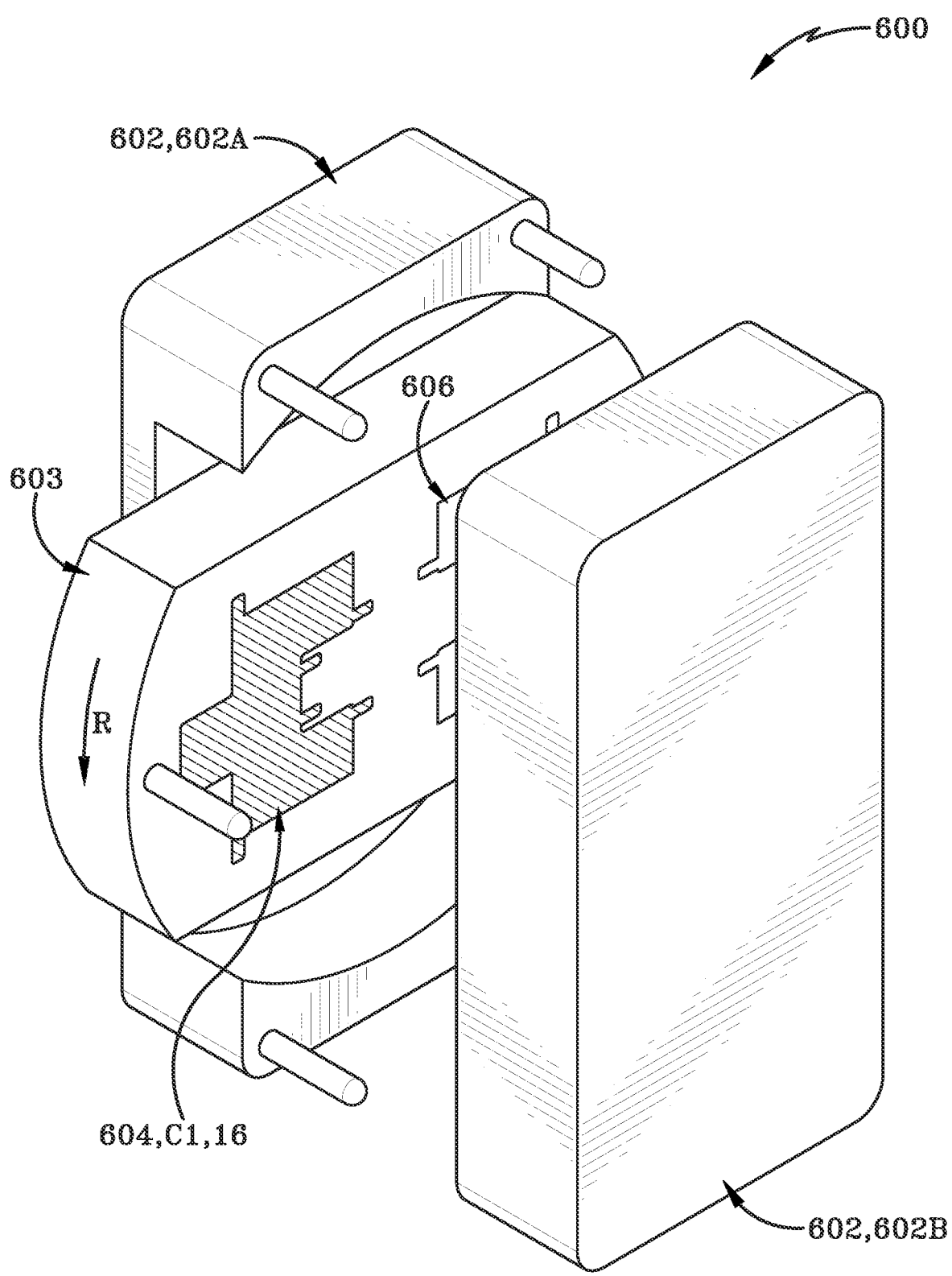
FIG. 22 (FIG. 22) is a further top front left isometric perspective operational view of the exemplary method of manufacturing the modular mat piece with the exemplary injection molding apparatus rotating to a second position.
Figure 23:
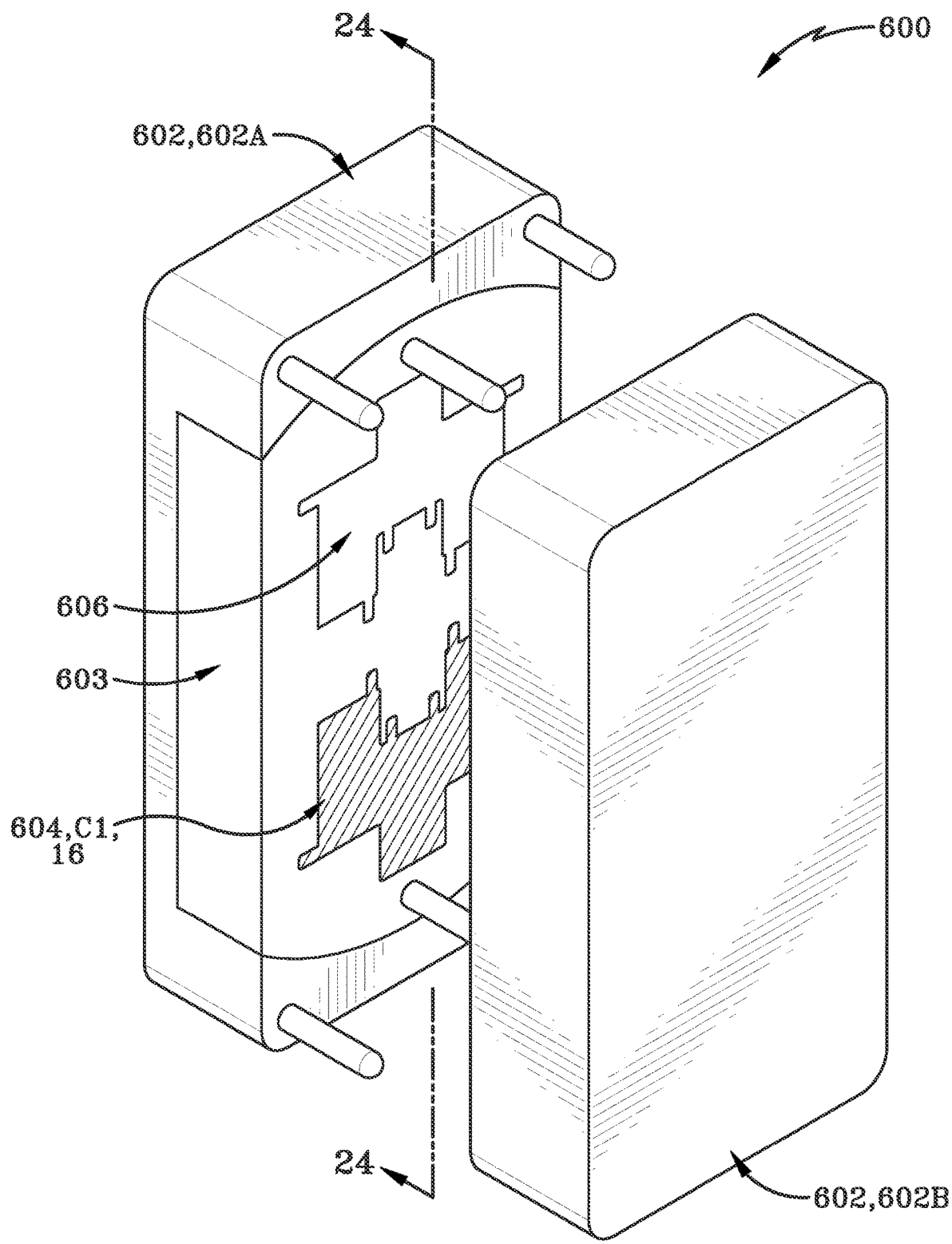
FIG. 23 (FIG. 23) is a further top front left isometric perspective operational view of the exemplary method of manufacturing the modular mat piece with the exemplary injection molding apparatus in the second position.
Figure 24:
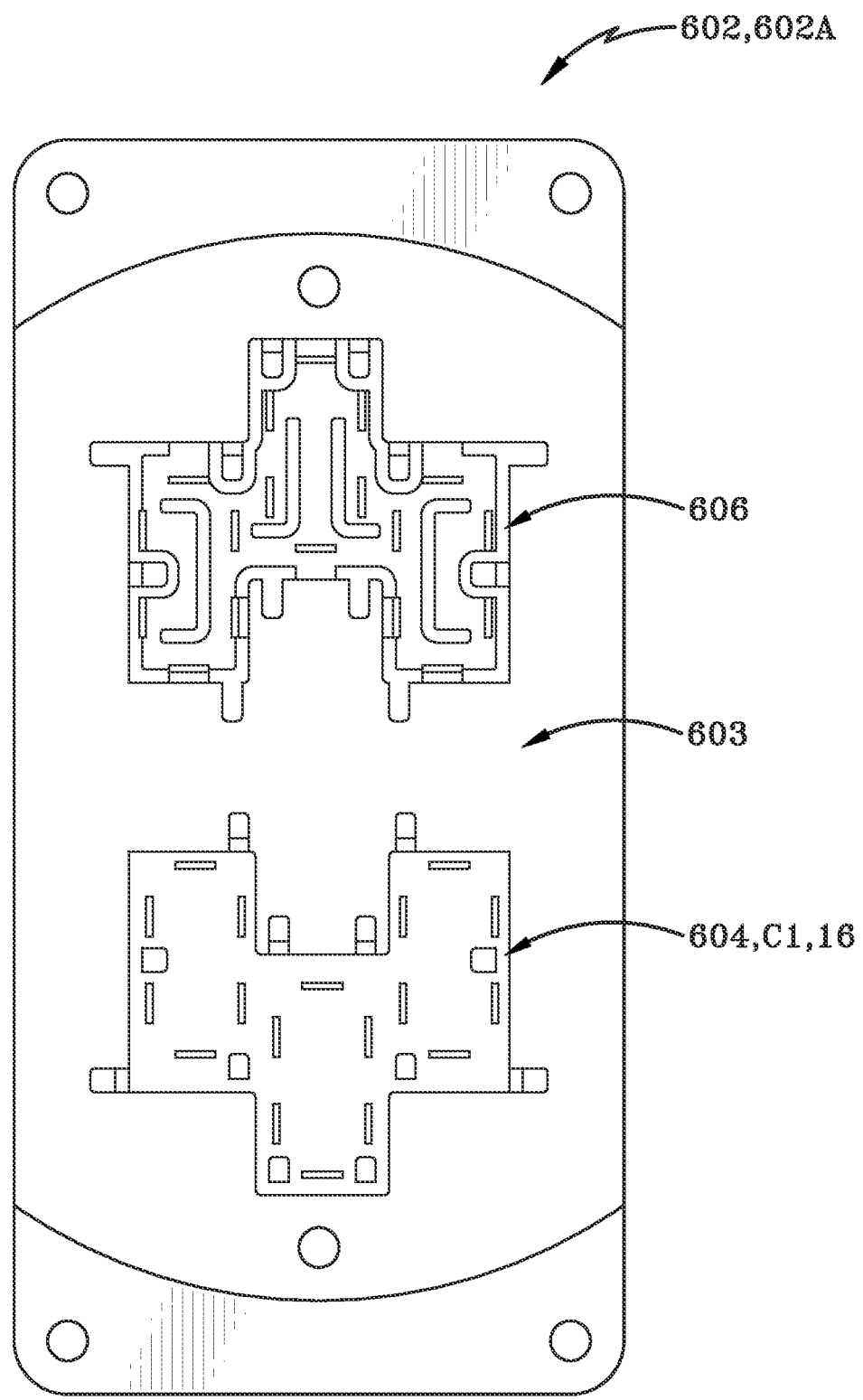
FIG. 24 (FIG. 24) is an elevation view looking in the direction of line 24-24 of FIG. 23.

After the second plate 16 is formed, the first side 602A about the rotatable portion 603 is then rotated about arrow "R" as shown in FIG. 22. This rotation "R" allows for alignment of the plates to an additional second plate 16 to be formed within the second section 606. The second section 606 is now on a top side while the first section 604 is on a bottom side as is seen by FIG. 23 and FIG. 24. A second molten material M2 is then injected into the fourth section 610 or the first section 604 while the first molten material M1 is injected into the second section 606.

Figure 25:
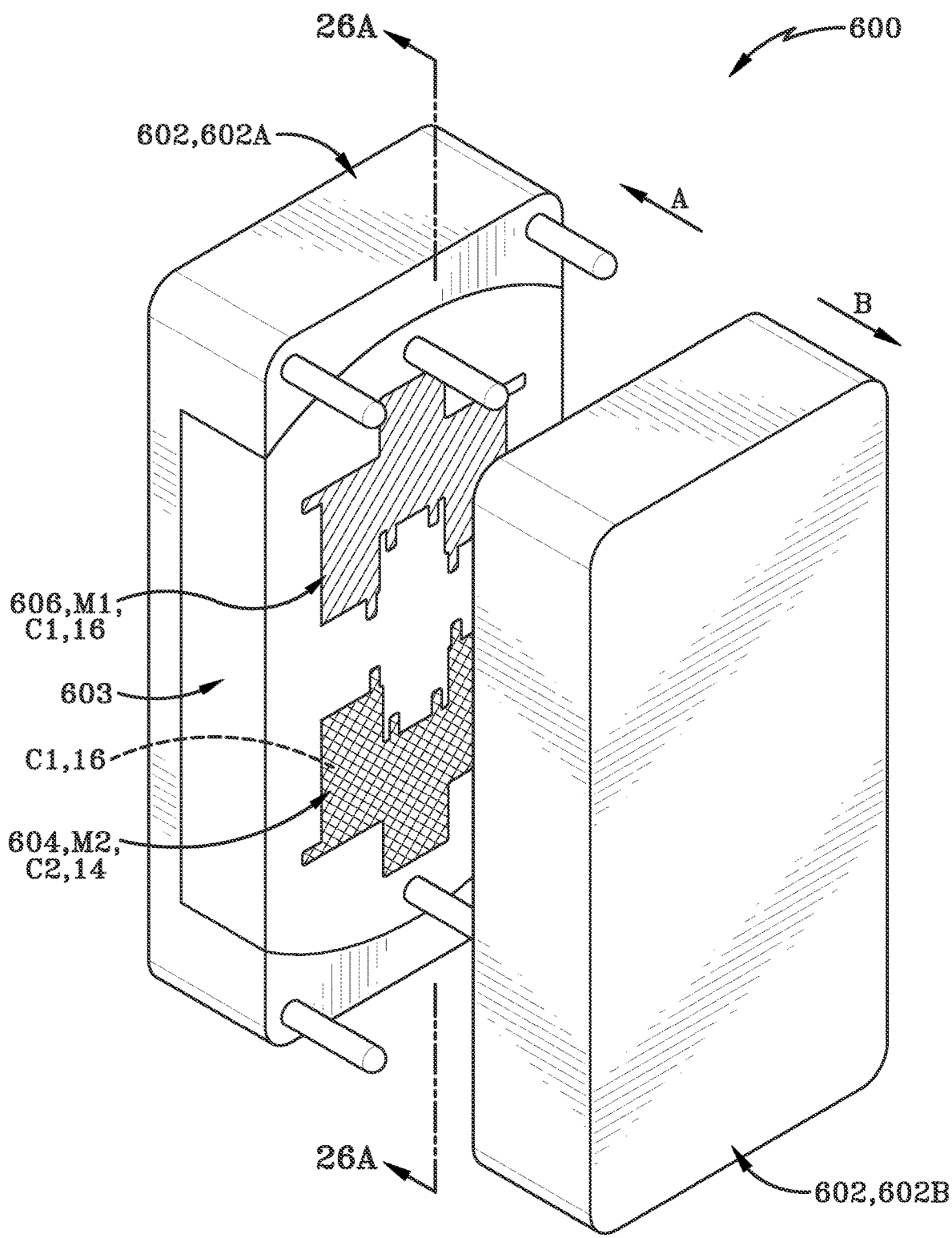
FIG. 25 (FIG. 25) is a further top front left isometric perspective operational view of the exemplary method of manufacturing the modular mat piece with the exemplary injection molding apparatus in the second position.
Figure 26A:
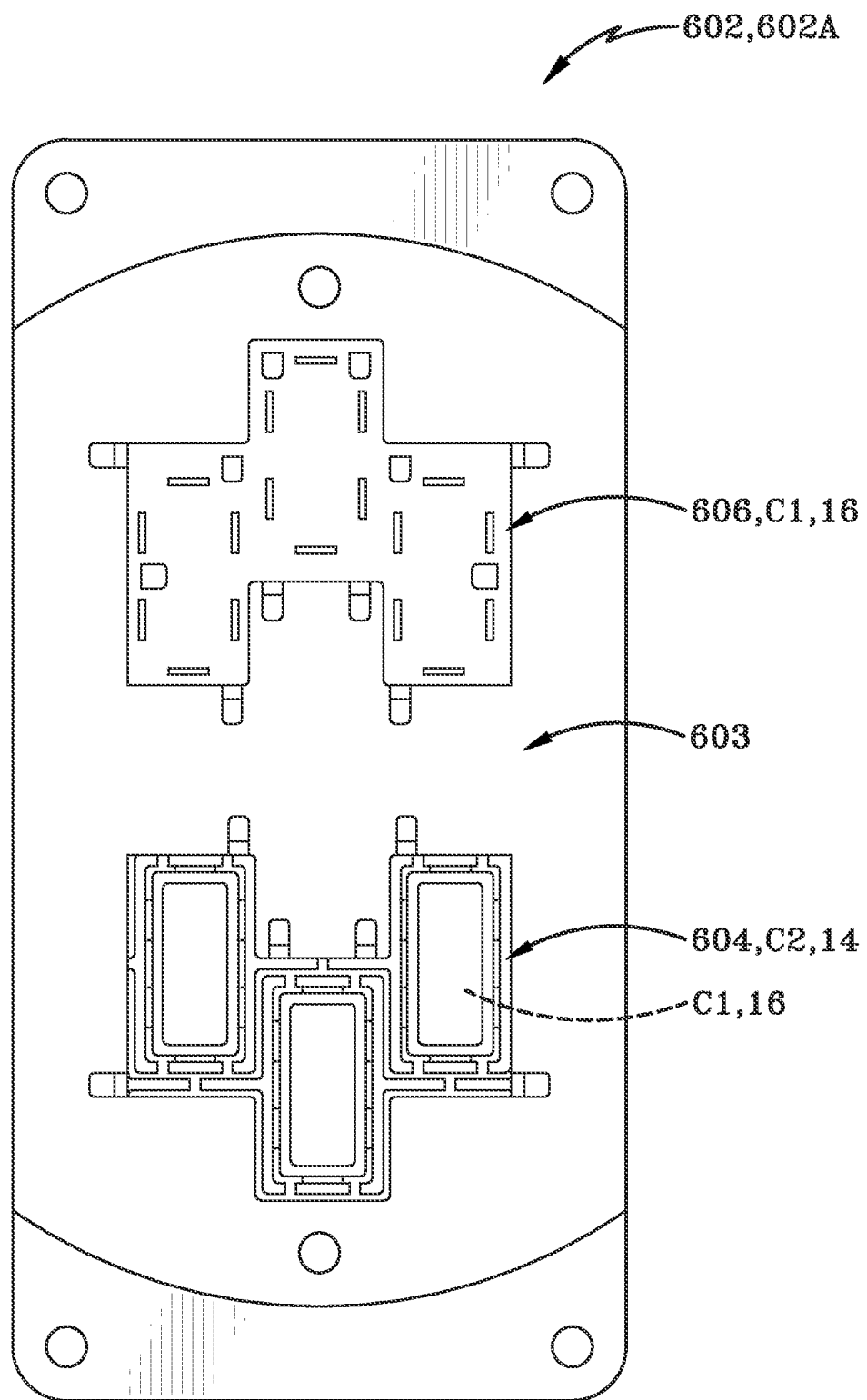
FIG. 26A (FIG. 26A) is an elevation view looking in the direction of line 26A-26A of FIG. 25.
Figure 26B:
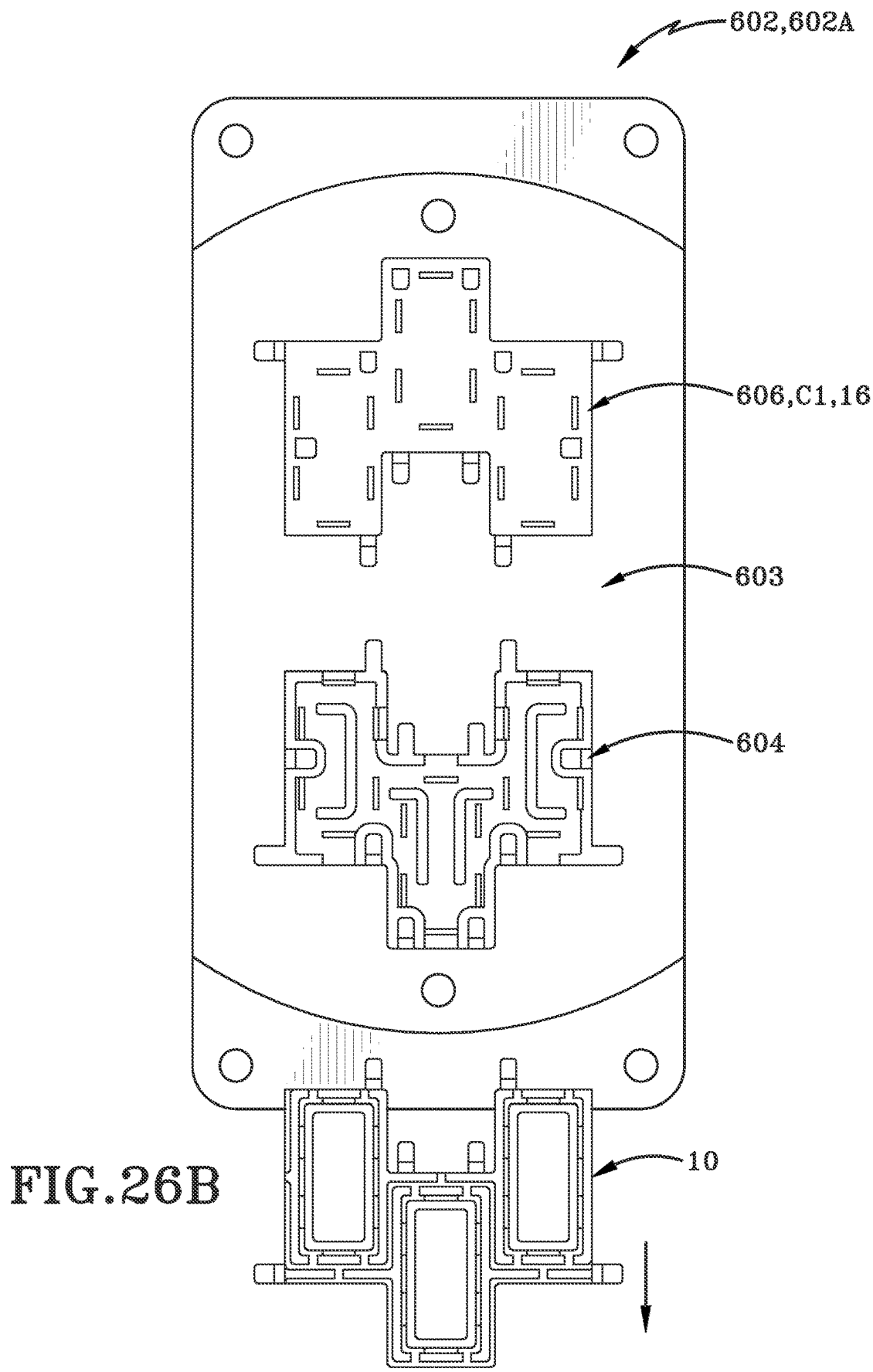
FIG. 26B (FIG. 26B) is a front elevation view of the exemplary injection molding apparatus ejecting a piece.
Figure 27:
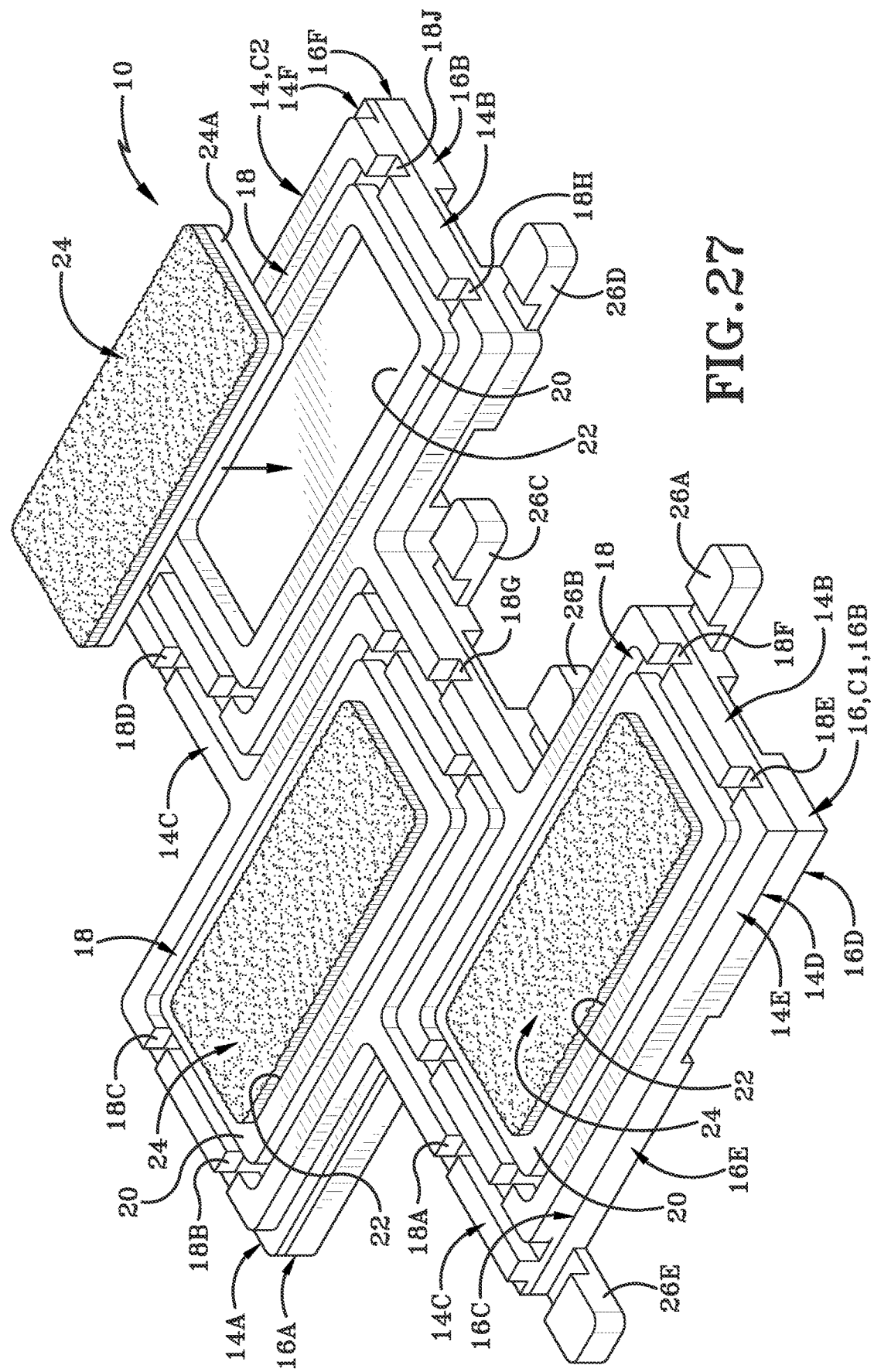
FIG. 27 (FIG. 27) is an isometric top perspective view of an assembled exemplary modular piece made by the exemplary manufacturing process with an insert being inserted into the piece.

As is shown in FIG. 25, the second side 602A moves first in a first direction "A" and the first section 604 or fourth section 610 is filled with the second molten material M2 and the second section 606 filled with the first molten material M1, and remains in order to compress the material into the first section 604 and fourth section 610 and the second section 606 and third section 608. Then, the second side moves in a second direction "B" once the first plate 14 and formerly formed second plate 16 are formed as one cohesive piece within the first section 604 and fourth section 610 while an additional second plate 16 is formed through contact with the second section 606 and the third section 608. As can be seen in FIG. 26A, this movement of the mold portion results in a second cured material "C2" within the first section 604 and the first cured material "C1" comprising the second plate 16 within the second section 606. As a device is formed in the first section 604, it may now be ejected to a bin or other receptacle as is shown in FIG. 26B. At this point, the first side 602A may rotate again and continue making additional completed pieces in the same manner forming incrementally.

The second material M2 that creates the top plate 14 differs from the first material M1 that creates the bottom plate 16 in Shore A durometer. In some embodiments the bottom plate 16 has a greater Shore A durometer than the top plate 14. In other embodiments, the top plate 14 has a greater Shore A durometer than the top plate 16. Further, the second material M2 may also differ from the first material M1 in composition. As a result of the first material M1 injection and second material M2 injection a complete piece 10 is formed. In an alternative embodiment, the first shot may create the top plate 14 and the second shot may create the bottom plate 16. Further, the top plate 14 and bottom plate 16 may further be referred to as first plate and second plate. After the plate is formed, an insert 24 may be placed into an insert accepting area 22. The inserts may be made of carpet, gel, or other similarly configured devices to be deployed within the desired implementation.

In another embodiment, it may be a three-shot injection molding process. Similar to the two shot molding process, the bottom plate 16 is formed first. As a result, a first material is shot into the injection molding machine and formed into the shape of the bottom plate 16. Then, the mold will rotate within the machine, and a second material is shot into the injection molding machine. The second material is operative to form the top plate 14. Then, a third material is shot into the injection molding machine and the insert accepting areas 24 are filled with the third material. The third material that creates the material, or inserts, within the insert accepting areas 24, the second material that creates the top plate 14 may both differ from the first material that creates the bottom plate 16 in Shore A durometer. Further, the third material, and the second material may also differ from the first material in composition. As a result of the first material injection, second material injection, and third material injection a complete piece 10 is formed. In an alternative embodiment, the first shot may create the top plate 14, while the second shot creates the material within the insert accepting areas 24 and the third shot creates the bottom plate 16. In such an embodiment the rotation would occur after the second shot, rather than after the first shot.

Figure 28:
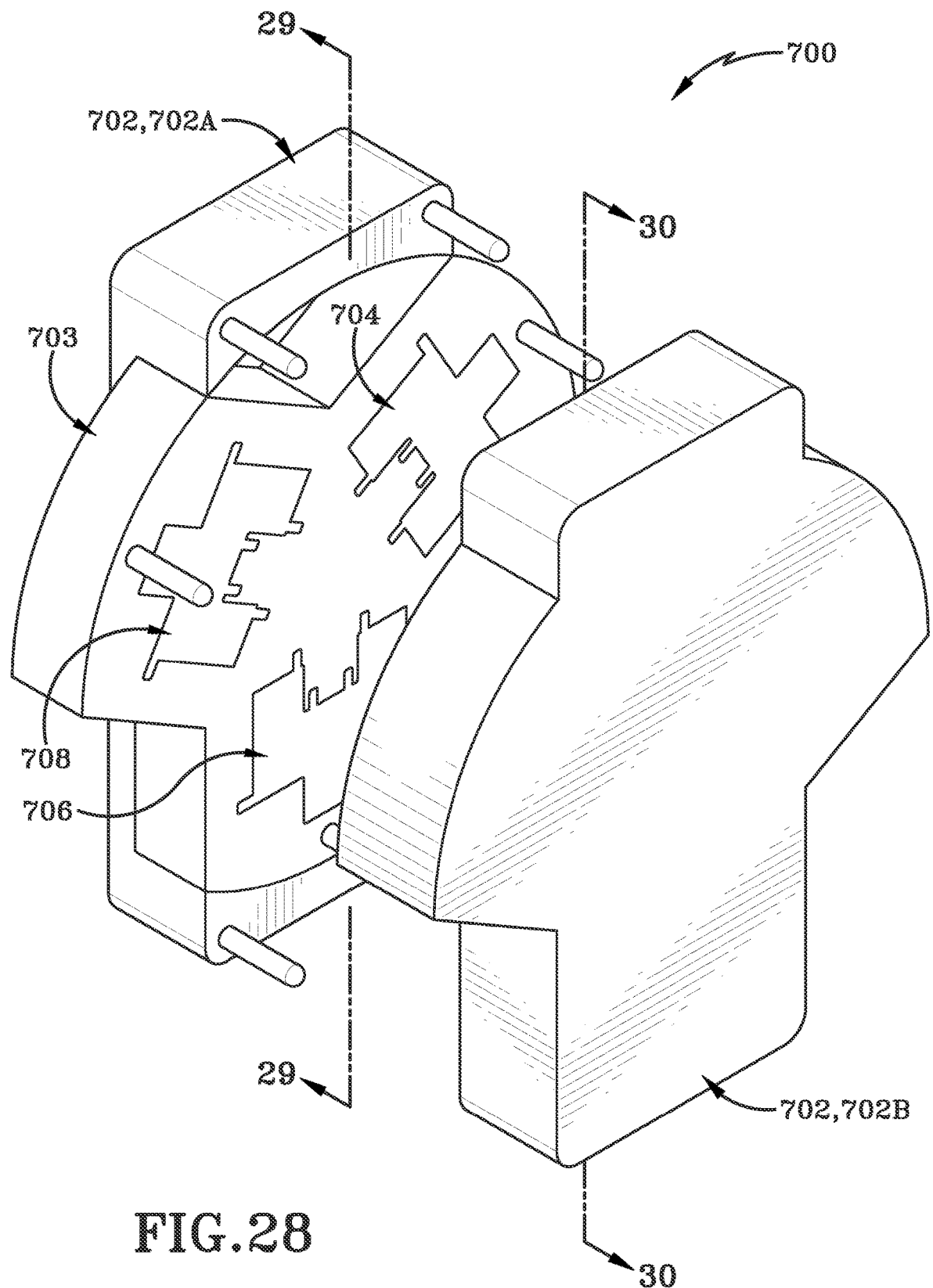
FIG. 28 (FIG. 28) is a top front right isometric perspective operational view of an alternative exemplary method of manufacturing the modular mat piece with an alternative exemplary injection molding apparatus in a first position.

Referring specifically to FIG. 28-FIG. 37, an alternative diagrammatic process for forming a single piece 10 is shown. Referring specifically to FIG. 28, the beginning of an alternative exemplary method of manufacturing the modular mat piece 10 with an alternative exemplary injection molding apparatus 700 is shown. In this figure, the molding apparatus 700 is shown in a first position. The exemplary injection molding apparatus 700 is shown in part, namely the mold portion 702 with a first side 702A and a second side 702B. The exemplary molding apparatus 700 has three mold sections on the first side 702A, a first section 704, a second section 706, and a third section 708. The first section 704, second section 706, and third section 708 are identical to each other.

Figure 29:
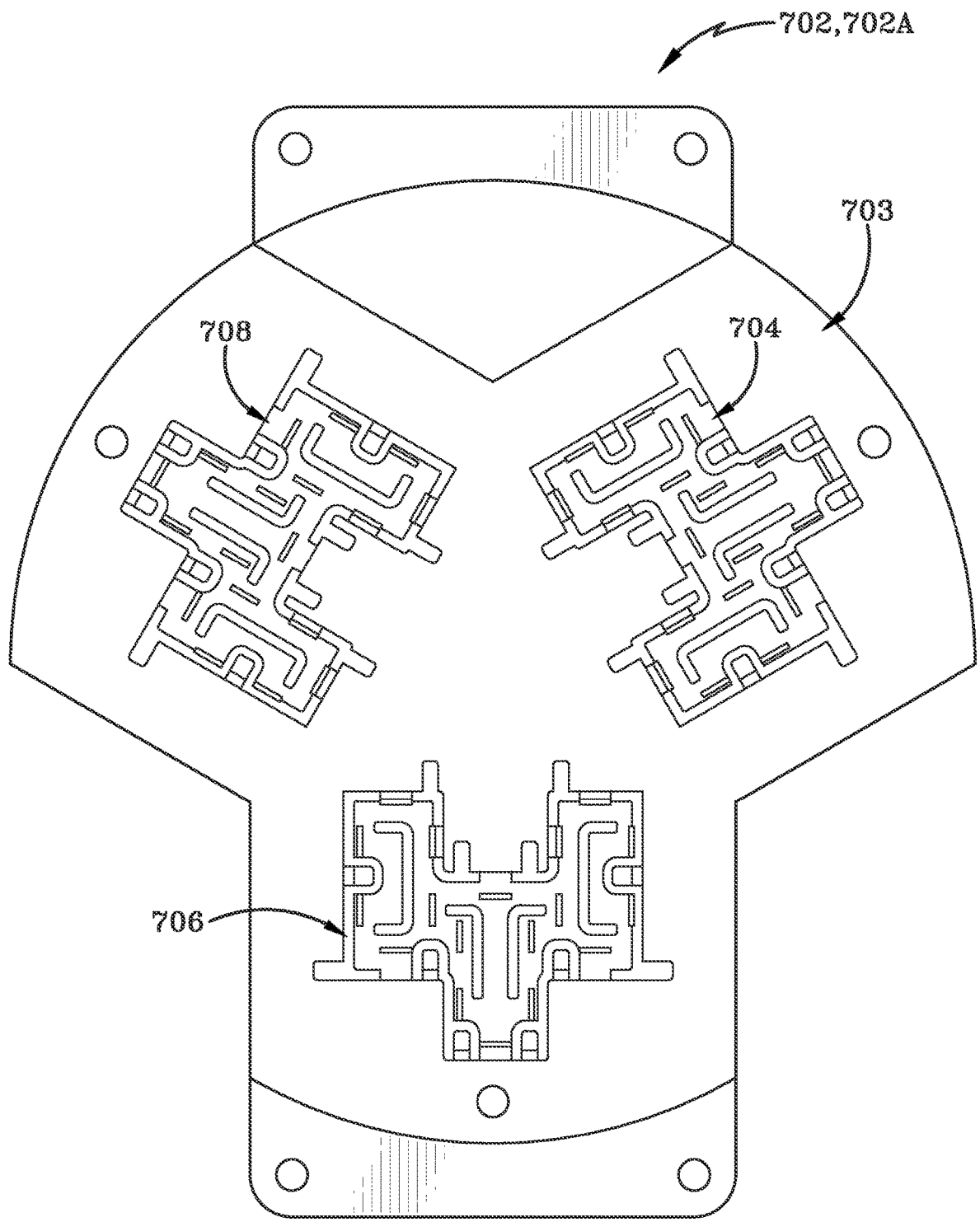
FIG. 29 (FIG. 29) is an elevation view looking in the direction of line 29-29 of FIG. 28.
Figure 30:
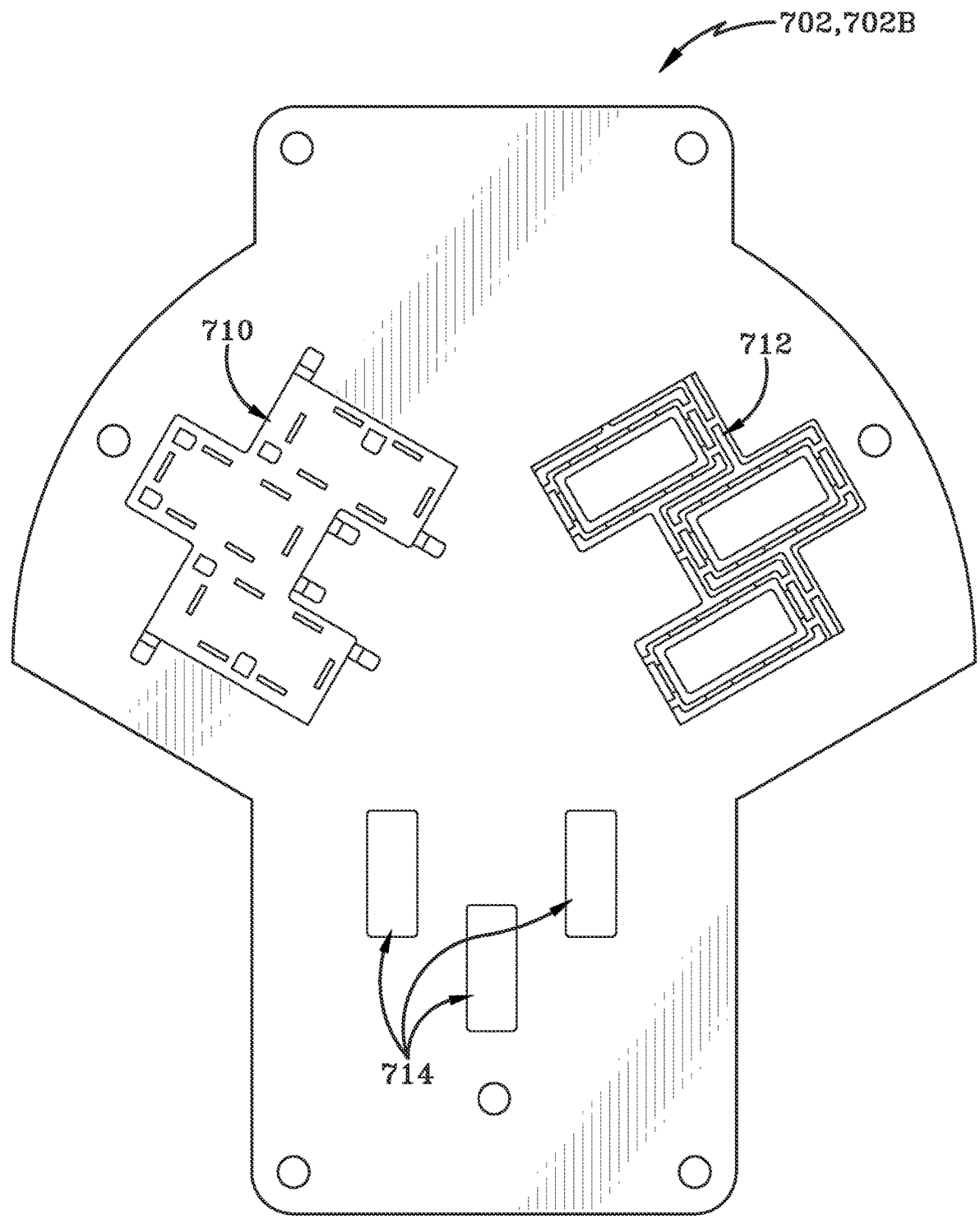
FIG. 30 (FIG. 30) is an elevation view looking in the direction of line 30-30 of FIG. 28.

Referring specifically to FIG. 29, an elevation view along line 29-29 of FIG. 28 is shown. This front elevation view shows the first section 704, second section 706, and third section 708 are identical to one another. All of the first section 704, the second section 706, and the third section 708 are operative to make the second plate 16. While when referring to FIG. 30, an elevation view along line 30-30 of FIG. 28 is shown. In this view, one can see the second side 702B containing a fourth section 710, a fifth section 712, and a sixth section 714. The fourth section 710 is operative to form the top side 16C of the second plate 16. The fifth section 712 is operative to form the first plate 14. The sixth section 714 is operative to form the inserts 24.

Figure 31:
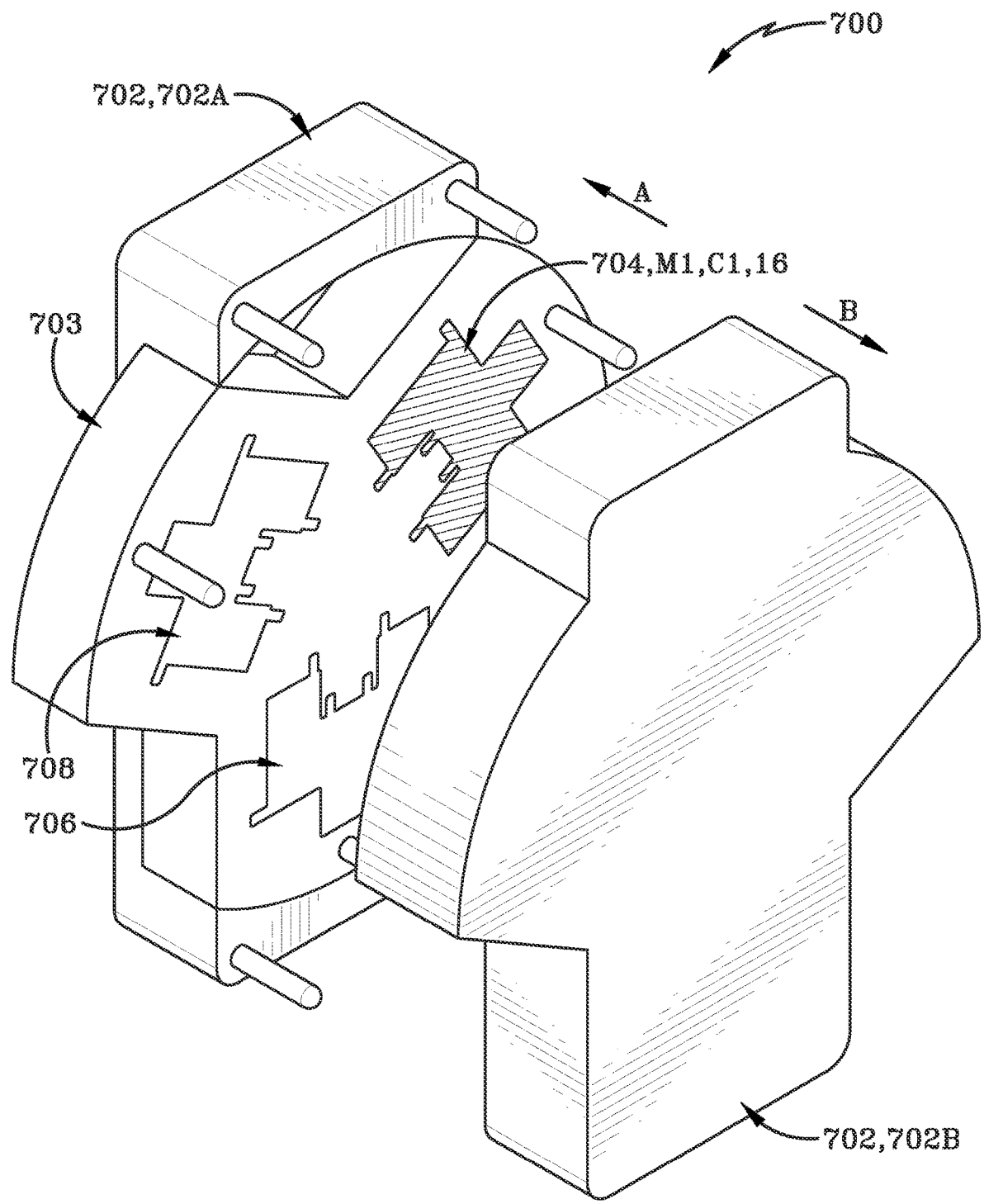
FIG. 31 (FIG. 31) is a top front left isometric perspective operational view of an alternative exemplary method of manufacturing the modular mat piece with an alternative exemplary injection molding apparatus in a first position.

Referring specifically to FIG. 31, the first section 704 has been filled with a first molten material M1 the second side 702B moves first in a first direction "A" and then the first section 704 is filled with a first molten material M1. After the first section 704 has been filled or shot with a molten first material M1 and in order to compress the material into the first section 704 and fourth section 710 the second side 702B remains in place for the curing to occur. Then, the second side 702B moves in a second direction "B" once the second plate 16 is formed in order to disengage the first side 702A with the second side 702B.

Figure 32:
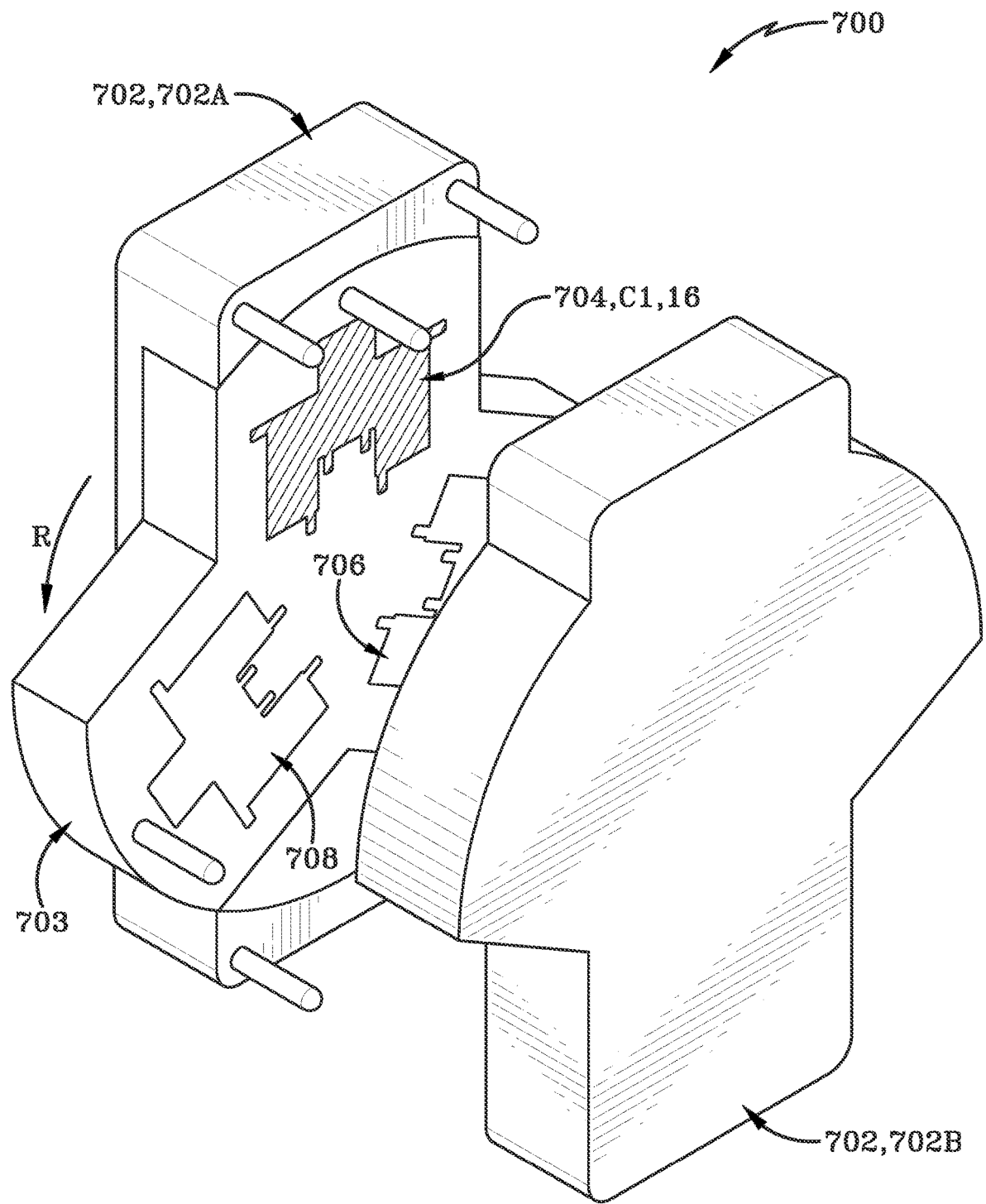
FIG. 32 (FIG. 32) is a further top front left isometric perspective operational view of an alternative exemplary method of manufacturing the modular mat piece with an alternative exemplary injection molding apparatus rotating to a second position.
Figure 33:
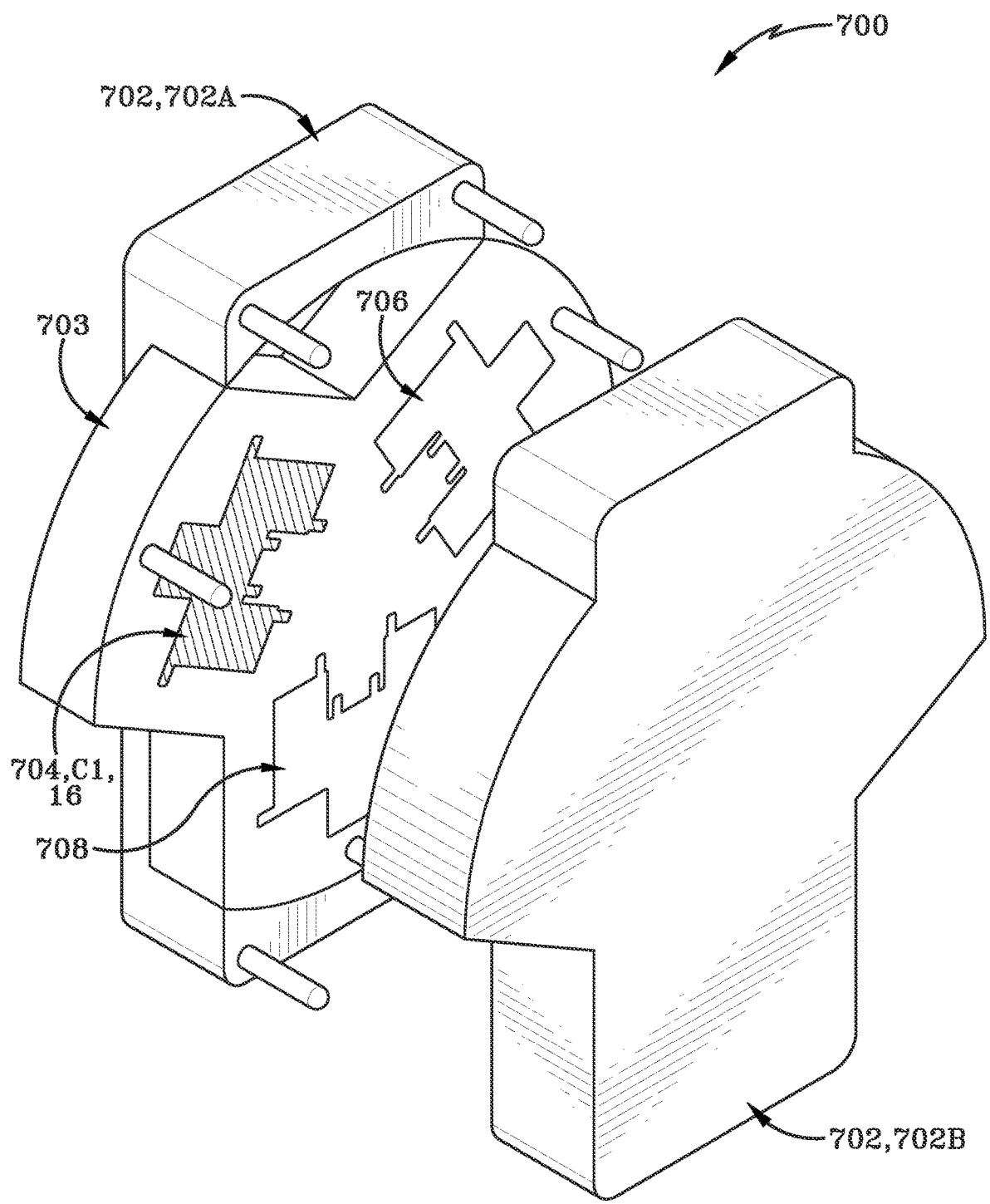
FIG. 33 (FIG. 33) is a further top front left isometric perspective operational view of an alternative exemplary method of manufacturing the modular mat piece with an alternative exemplary injection molding apparatus in the second position.

After the second plate 16 is formed, the first side 702A is then rotated about the rotatable portion 603 about arrow "R" as shown in FIG. 32. This rotation "R" allows for alignment of plates to create an additional second plate 16 to be formed within the second section 706. The first side 702A is now in the second position. In the second position, the second section 706 is now on a top side while the first section 704 is rotated one third of a rotation towards a bottom side to where the third section 708 was, and the third section 708 moved to where the second section 706 was, as is seen in FIG. 33.

Figure 34:
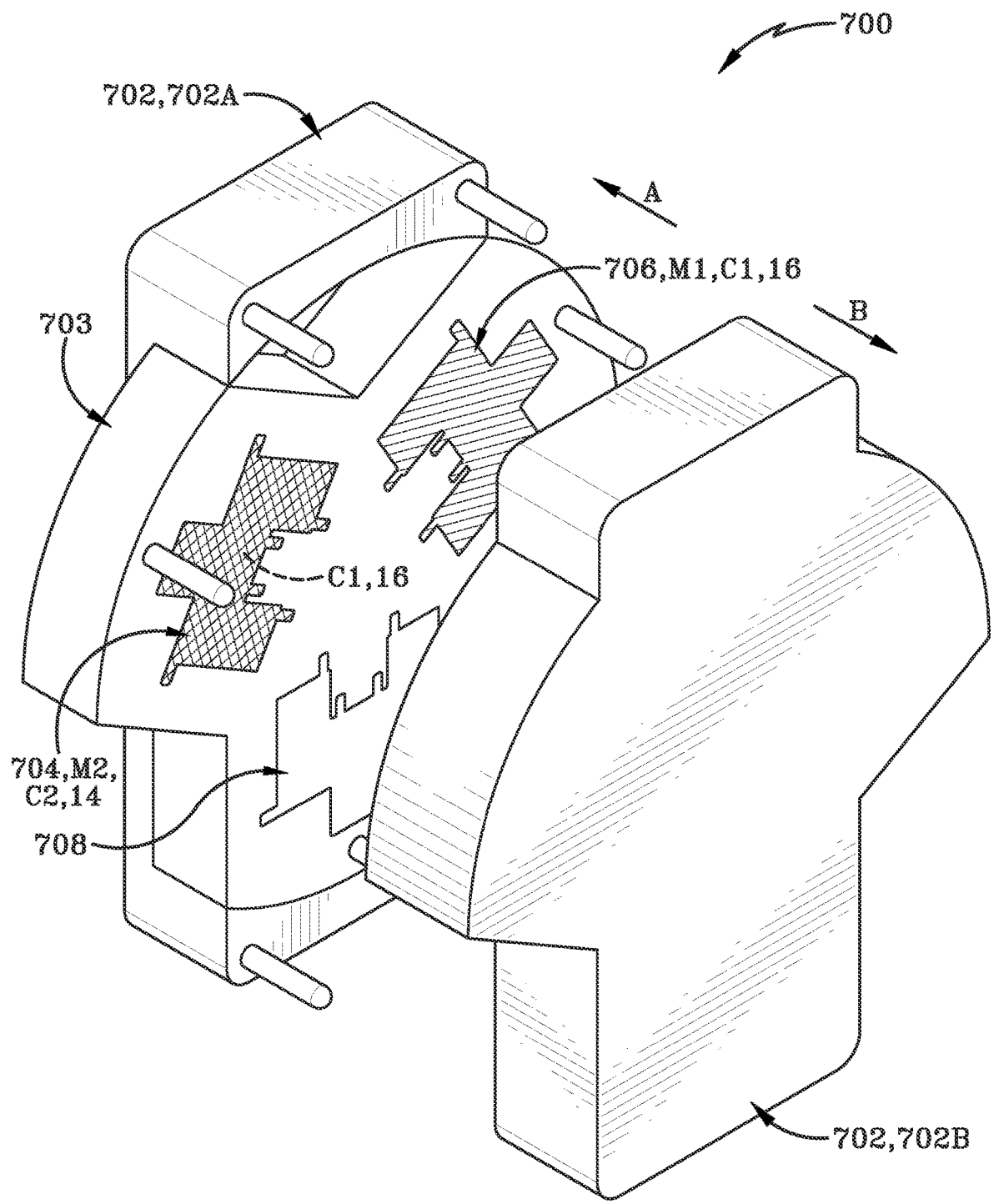
FIG. 34 (FIG. 34) is a further top front left isometric perspective operational view of an alternative exemplary method of manufacturing the modular mat piece with an alternative exemplary injection molding apparatus in the second position after molding.

Continuing on to FIG. 34, the second side 702A moves first in a first direction "A". A second molten material M2 is then injected into the fifth section 712 or the first section 704 while the first molten material M1 is injected into the second section 706. Then, after the first section 704 or fifth section 712 has been filled with the second molten material M2 and the second section 706 filled with the first molten material M1, and remains in order to compress the material into the first section 704 and fifth section 712 and the second section 706 and fourth section 710. Then, the second side moves in a second direction "B" once the first plate 14 and formerly formed second plate 16 are formed as one cohesive piece within the first section 704 and fifth section 712 while an additional second plate 16 is formed through contact with the second section 706 and the fourth section 710.

Figure 35:
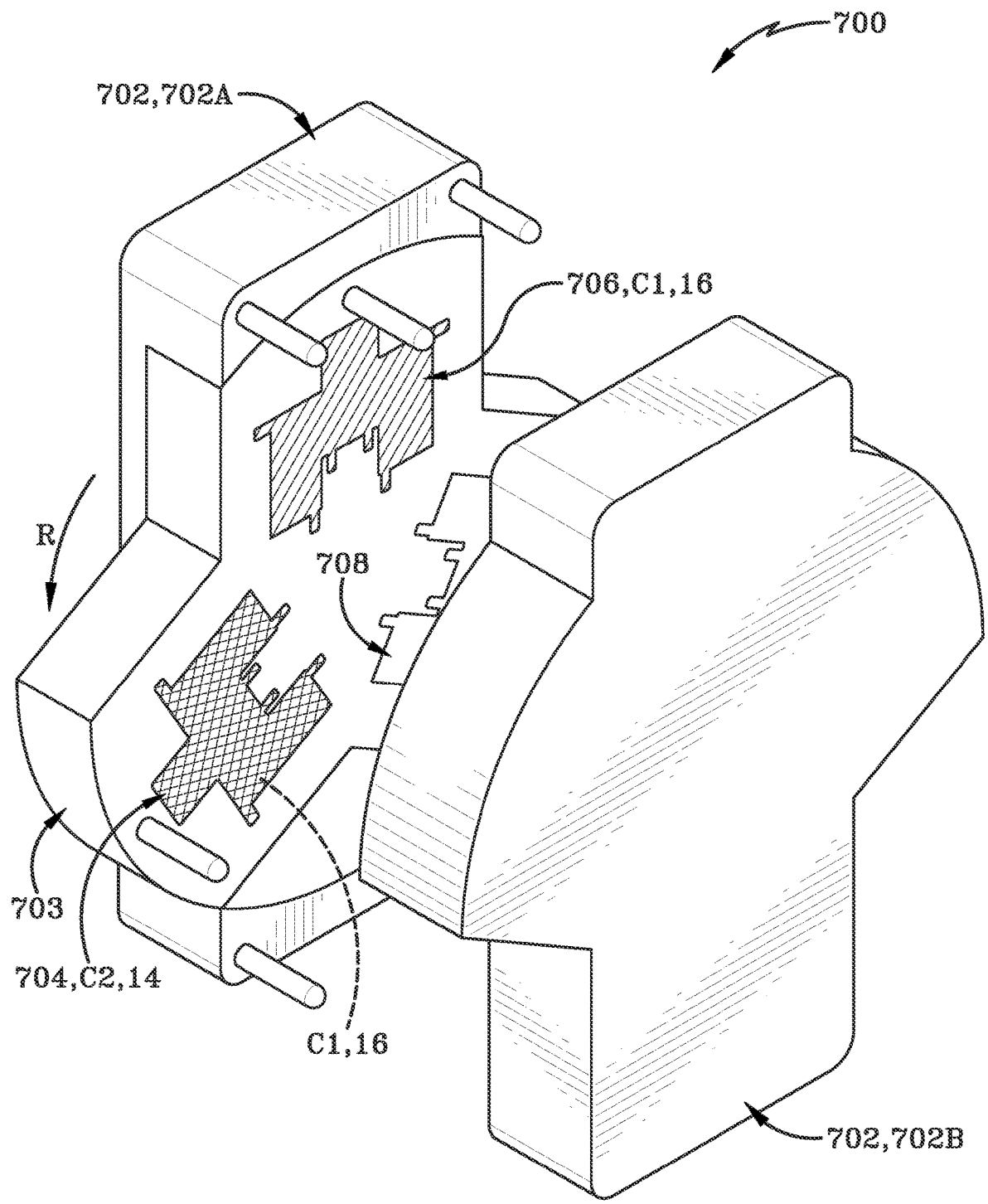
FIG. 35 (FIG. 35) is a further top front left isometric perspective operational view of an alternative exemplary method of manufacturing the modular mat piece with an alternative exemplary injection molding apparatus in rotating to be in a third position.
Figure 36:
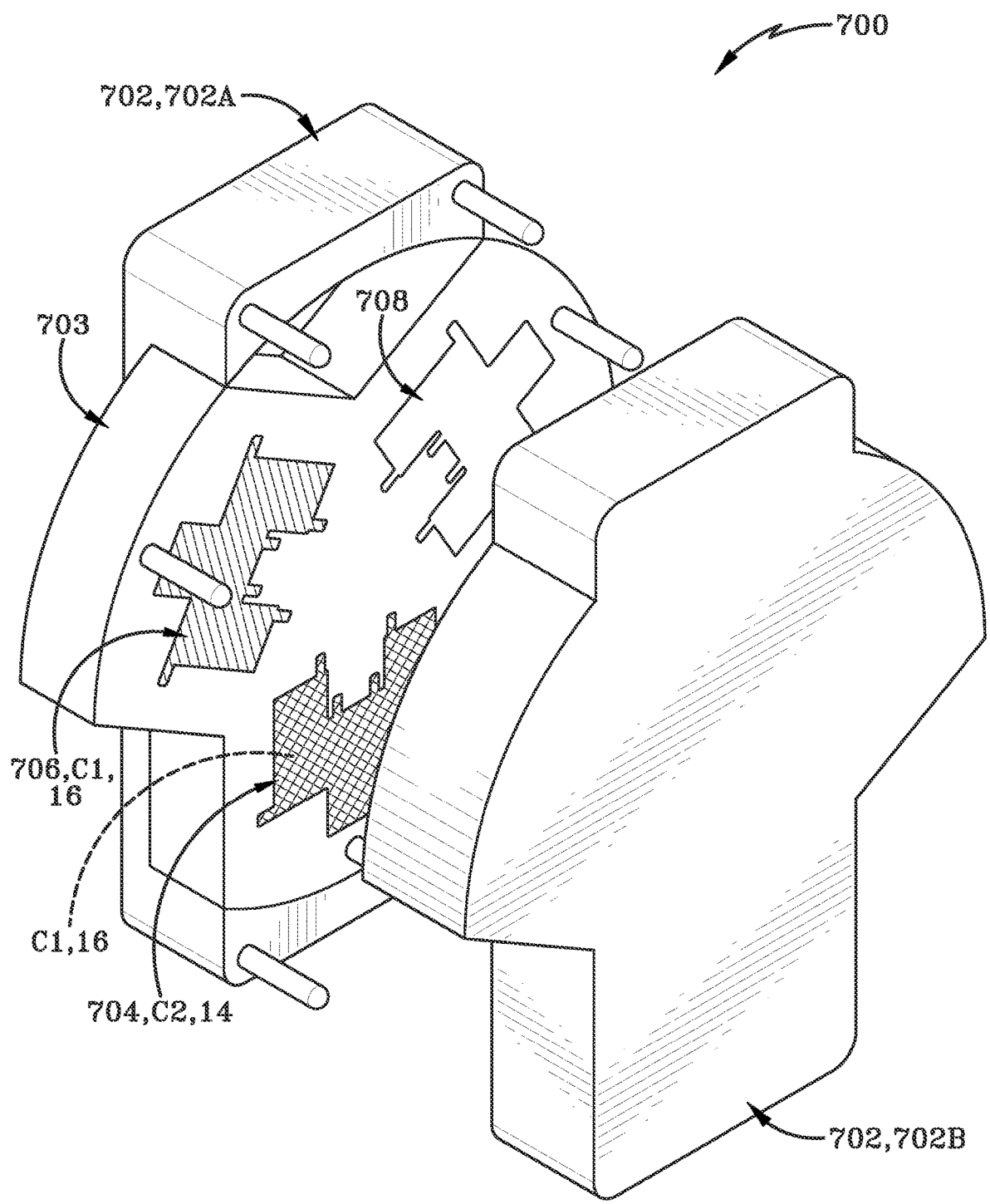
FIG. 36 (FIG. 36) is a further top front left isometric perspective operational view of an alternative exemplary method of manufacturing the modular mat piece with an alternative exemplary injection molding apparatus in the third position.

As can be seen in FIGS. 35 and 36, the contact of the mold portion results in a second cured material "C2" within the first section 604 and the first cured material "C1" comprising the second plate 16 within the second section 606. After the second plate 16 is formed, the first side 702A is then rotated about arrow "R" as shown in FIG. 35. This rotation "R" allows for a third second plate 16 to be formed within the third section 708 through alignment of the plates. The first side 702A is now in a third position. In the third position, the third section 708 is now on a top side while the second section 706 is rotated one third of a rotation towards a bottom side to where the first section 704 was, and the third section 708 moved to where the second section 706 was at the top, as is seen in FIG. 36.

Figure 37:
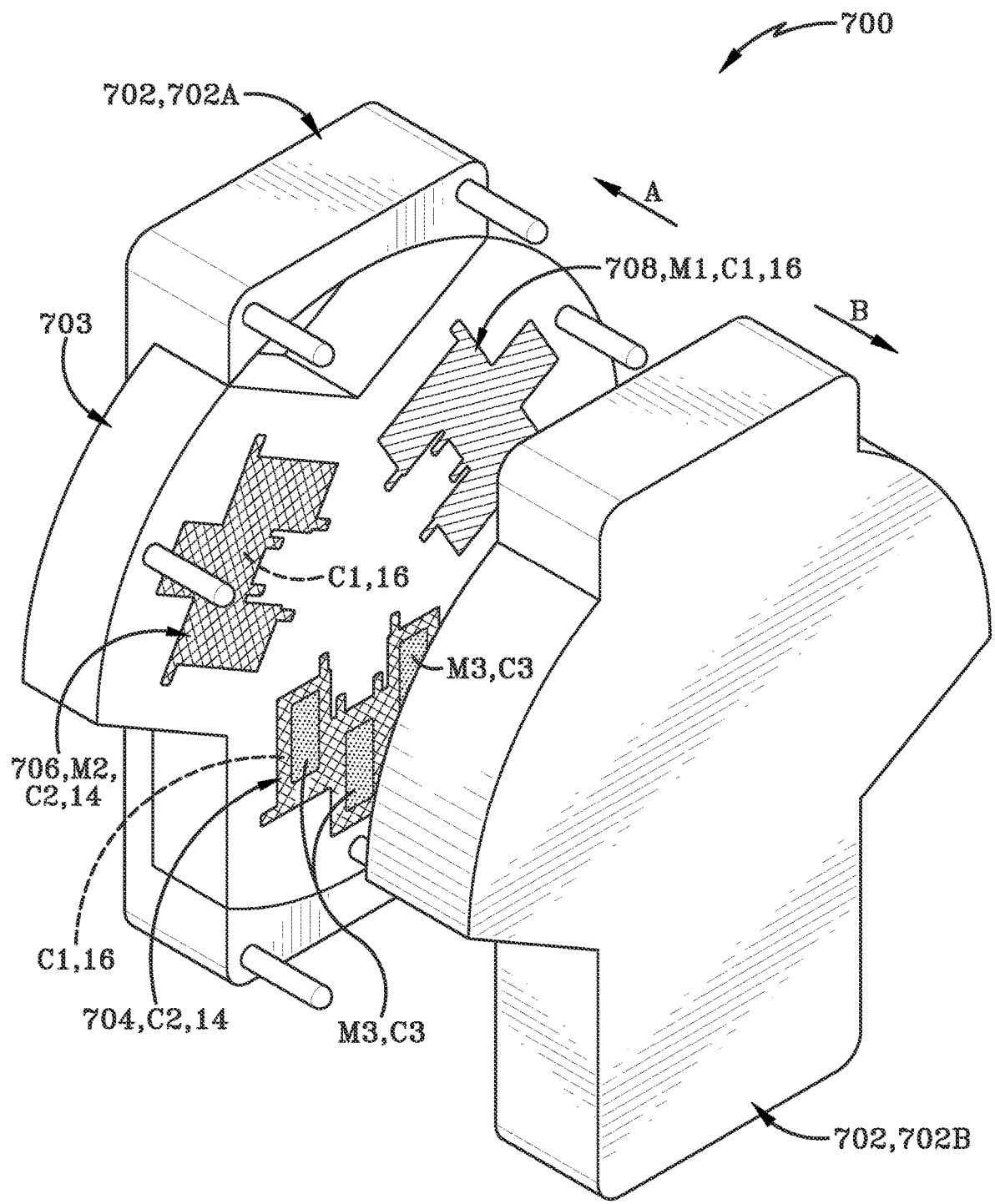
FIG. 37 (FIG. 37) is a further top front left isometric perspective operational view of an alternative exemplary method of manufacturing the modular mat piece with an alternative exemplary injection molding apparatus in rotating to be in the third position after molding.

Continuing on to FIG. 37, the second side 702A moves first in a first direction "A". A third molten material M3 is then injected into the sixth section 714 or the first section 704 while a second molten material M2 is injected into the fifth section 712 or the second section 706, and the first molten material M1 is injected into the third section 708. Then, after the sixth section 714 or the first section 704 having been filled with the third molten material M3, the fifth section 712 or the second section 706 filled with the second molten material M2, and the third section 708 having been filled with the first molten material M1, remains in place in order to compress the material M3 into the first section 704 and sixth section 714, compress the material M2 in the second section 706 and fifth section 712, and compress the material M3 between the third section 708 and the fourth section 710. Then, once the materials, M1, M2, and M3 are compressed and formed, the second side moves in a second direction "B" once the completed piece 10 is formed between the first section 704 and the sixth section 714, the first plate 14 and formerly formed second plate 16 are formed as one cohesive piece within the second section 706 and fifth section 712, while an additional second plate 16 is formed through contact with the third section 708 and the fourth section 710. The material M3 becomes the cured material C3, which forms the inserts 24 to be formed in the insert accepting areas 22.

As a completed device 10 is formed in the first section 704, it may now be ejected to a bin or other receptacle. At this point, the first side 702A may rotate again and continue making additional completed pieces in the same manner as described above.

Similar to the prior embodiment, the second material M2 that creates the top plate 14 differs from the first material M1 that creates the bottom plate 16 in Shore A durometer when in their cured form C2, C1 respectively. In some embodiments the bottom plate 16 has a greater Shore A durometer than the top plate 14. In other embodiments, the top plate 14 has a greater Shore A durometer than the top plate 16. Further, the second material may also differ from the first material in composition. As a result of the first material injection and second material injection a complete piece 10 is formed. In an alternative embodiment, the first shot may create the top plate 14 and the second shot may create the bottom plate 16. Further, the top plate 14 and bottom plate 16 may further be referred to as first plate and second plate.

Further, the insert 24 formed with the insert accepting area 22 made of material M3 and cured material C3, may be of a different material than either the first material M1 or the second material M2 with different Shore A durometer. In one embodiment cured material C3 may have a Shore A durometer less than that of the Shore A durometer of C2 or C1. In other embodiments the material C3 may have a Shore A durometer greater than the Shore A durometer of C1 or C2. In further embodiments the Shore A durometer of C3 may be equal to one or both of C1 or C2.

Both of the multi-shot techniques may be done in a single press and one single mold. The molds include a cavity plate which houses the various sections of the molding apparatuses 600, 700, which is a plate used to create a cavity (via a gap) that will be filled with the plastic material and form the plastic component. The cavity plate is traditionally made of mild steel. The mold further includes a core plate. The core plate projects into the cavity place and creates hollow portions within the molded component. The core plate is traditionally made of hardened hot die P20 steel without hardening after machining.

The core and cavity plates of the injection molding machine are insertable and interchangeable. Further, the variety of materials with varying Shore A durometers allow for near endless amounts of customization of the final system. The system may be specialized for every customer individually to create a variety of materials with a variety of shapes, colors, inserts, and the like.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein.

It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A modular floor mat system comprising:
   a plurality of tiles which are arranged in a side-by-side arrangement and are operatively engaged with one another, wherein each tile of the plurality of tiles is injection molded and comprises:
   a first plate;
   a second plate positioned vertically beneath the first plate, said first plate and second plate being operatively engaged with one another;
   an insert accepting area defined in a surface of the first plate remote from the second plate;
   an insert received in the insert accepting area;
   wherein each tile further includes a wear-indicator to indicate to a user when the first plate is worn, broken, fractured or otherwise damaged, the wear-indicator comprising:
   a first color provided in the first plate and a second color provided in the second plate, wherein the second color is different from the first color, and wherein the second color becomes visible from above as the first plate becomes worn, broken, fractured or otherwise damaged and needs to be replaced; and
   wherein the insert accepting area is of a different color from the rest of the first plate, and the different color is operative to act as an indicator to place the insert into the insert accepting area or to replace the insert when the insert becomes worn.

2. The modular floor mat system according to claim 1, wherein the first plate defines a plurality of first through holes therein, and the second plate defines a plurality of second through holes therein.

3. The modular floor mat system according to claim 2, wherein the plurality of first through holes and the plurality of second through holes are at least partially aligned with one another.

4. The modular floor mat system according to claim 1, wherein the insert is fabricated from a material different to the material used to fabricate the first plate.

5. The modular floor mat system according to claim 4, wherein the insert is fabricated from one or more of a carpet material, a tear-resistant microfiber material, a non-woven material, a polymer gel material, and a gel-material.

6. The modular floor mat system according to claim 1, wherein the first plate is fabricated from a first material with a first Shore A durometer, and the second plate is fabricated from a second material with a second Shore A durometer that is different from the first Shore A Durometer.

7. A tile for a modular floor mat system, said tile comprising:
   a first plate;
   a second plate positioned beneath a lower surface of the first plate;
   at least one insert accepting area defined in an upper surface of the first plate remote from the second plate;
   an insert provided in each of the at least one insert accepting area;
   a wear-indicator provided on the tile to indicate to a user when the first plate is worn, broken, fractured or otherwise damaged, the wear-indicator comprising:
   a first color provided in the first plate and a second color provided in the second plate, wherein the second color is different from the first color, and wherein the second color becomes visible from above as the first plate becomes worn, broken, fractured or otherwise damaged and needs to be replaced; and
   wherein the at least one insert accepting area is a different color from the rest of the first plate, and the different color is operative to act as an indicator for the user to place the insert into the at least one insert accepting area or to replace the insert when insert becomes worn, broken, fractured or otherwise damaged.

8. The tile according to claim 7, further comprising:
   a plurality of first through holes defined in the first plate; and
   a plurality of second through holes defined in the second plate, wherein the plurality of first through holes and the plurality of second through holes are at least partially aligned with one another.

9. The tile according to claim 7, wherein the insert is fabricated from a material different to the material of the first plate.

10. The tile according to claim 9, wherein the insert is fabricated from one or more of a carpet material, a tear-resistant microfiber material, a non-woven material, a polymer gel material, and a gel-material.

11. The tile according to claim 7, wherein the first plate is fabricated from a first material with a first Shore A durometer, and the second plate is fabricated from a second material with a second Shore A durometer that is different from the first Shore A Durometer.

12. The tile according to claim 7, wherein the first plate and the second plate are connected to one another through melting as a result of an injection molding process used to form the first plate and the second plate.

13. A modular floor mat system comprising:
a plurality of tiles each made by an injection molding process, wherein each tile comprises:
a first plate defining a plurality of first through holes therein;
a second plate defining a plurality of second through holes therein, wherein the plurality of first through holes and the plurality of second through holes are at least partially aligned with one another;
wherein the first plate and the second plate are operatively engaged with one another;
wherein the first plate has a first Shore A durometer and the second plate has a second Shore A durometer, and the first Shore A durometer and second Shore A durometer are of different values;
at least one insert accepting area defined in the first plate;
an insert disposed in each of the at least one insert accepting area; and
wherein the first plate is of a different color to one or both of the at least one insert accepting area and the second plate.

14. The floor mat system of claim 13, wherein the at least one insert is fabricated from a material which differs from a material used to fabricate the first plate.

15. The floor mat system of claim 13, further comprising a releasable connection between the insert and the insert accepting area.

* * * * *